United States Patent [19]

Meccariello et al.

[11] Patent Number: 4,703,496
[45] Date of Patent: Oct. 27, 1987

[54] AUTOMATIC X-RAY IMAGE BRIGHTNESS CONTROL

[75] Inventors: Thomas V. Meccariello, Waukesha; Gary F. Relihan, Nashotah, both of Wis.

[73] Assignee: General Electric Company, Schenectady, N.Y.

[21] Appl. No.: 8,089

[22] Filed: Jan. 22, 1987

Related U.S. Application Data

[63] Continuation-in-part of Ser. No. 814,902, Dec. 30, 1985.

[51] Int. Cl.$^4$ ............................................... H05G 1/64
[52] U.S. Cl. ..................................... 378/99; 378/108; 378/109; 378/110; 378/111; 378/112; 378/114; 378/115; 378/116; 358/111; 340/347 DD
[58] Field of Search ............ 378/97, 99, 101, 108–112, 378/114–116, 160; 358/111; 364/414, 715; 340/347 DD

[56] References Cited

U.S. PATENT DOCUMENTS

| | | | |
|---|---|---|---|
| 3,894,235 | 7/1975 | Franke | 378/108 |
| 4,101,776 | 7/1978 | Mansfield et al. | 378/109 |
| 4,361,901 | 11/1982 | Daniels et al. | 378/110 |
| 4,454,606 | 6/1984 | Relihan | 378/97 |
| 4,473,843 | 9/1984 | Bishop et al. | 364/414 |
| 4,553,255 | 11/1985 | Kanerva | 378/110 |
| 4,573,183 | 2/1986 | Relihan | 378/99 |
| 4,590,603 | 5/1986 | Relihan et al. | 378/108 |
| 4,593,371 | 6/1986 | Grajewski | 378/108 |

Primary Examiner—Craig E. Church
Assistant Examiner—John C. Freeman
Attorney, Agent, or Firm—Fuller, Puerner & Hohenfeldt

[57] ABSTRACT

A voltage signal proportional to the brightness of an x-ray image is derived. In a mA loop the ratio of a reference voltage to brightness is determined. If the brightness ratio does not equal 1 it causes the x-ray tube current controller to adjust current (mA) to eliminate the error. A command proportionate to the ratio is stored until the next image frame. In a kV loop a ratio of the last mA command and a set limit for mA is taken. This error ratio is multiplied by the brightness ratio to provide a kV control ratio indicative of how much of the brightness error the kV loop is obliged to correct. The kV control ratio is corrected for nonlinearity between kV change and brightness change and the resulting command is used to adjust the kV applied to the x-ray tube anode. In a video gain control loop a ratio is taken between the stored last brightness ratio or mA command and maximum mA command limit and the brightness change resulting from the last kV control command is ratioed to the maximum brightness factor limit. The result of multiplying the last two mentioned ratios and the brightness ratio is the new video gain (VG) control signal. The VG signal is used to adjust the f-stop of the video camera and the electronic gain to change brightness.

14 Claims, 12 Drawing Figures

AUTOMATIC X-RAY IMAGE BRIGHTNESS CONTROL

PRIOR APPLICATION

This application is a continuation-in-part of prior application Ser. No. 814,902, filed Dec. 30, 1985 by applicants Thomas V. Meccariello and Gary F. Relihan and titled "Automatic X-ray Image Brightness Control".

BACKGROUND OF THE INVENTION

This invention pertains to a method and apparatus for controlling the brightness of x-ray images during fluoroscopy and during cinerecording.

The automatic brightness control (ABC) subsystem is that part of a diagnostic x-ray control system which keeps the light of the output image from an x-ray image intensifier constant during fluoroscopy to compensate for variations in attenuation due to scanning over different thicknesses and densities of the body and for variations in system geometry. The output image is viewed by a video camera and displayed on a television monitor. Usually, the x-ray system is equipped for recording images with cine and photospot cameras and on various magnetic recording media.

In the fluoroscopic mode, x-ray exposures are usually continuous and of long duration so x-ray tube current and, hence, x-ray photon output and dose rate are relatively low. Government regulations require that during fluoroscopy dose rate shall not exceed 10 Roentgens per minute (10R/min) at the plane where the x-ray beam enters the patient.

Automatic brightness control systems commonly have two control loops. One loop responds to brightness variation by automatically adjusting x-ray tube anode-to-cathode milliamperage (mA) and kilovoltage applied to the anode of the tube in an attempt to keep the brightness of the image intensifier output phosphor constant. The other loop provides for adjusting the gain of the video camera in response to brightness. One problem with two control loop systems acting independently is that when the x-ray beam attenuation varies as it scans over the body, or any opaque x-ray material in the bloodstream flows into the field of view or the x-ray tube focal spot-to-image distance (SID) changes, both controls try to correct brightness. This inevitably results in overshoot by one or the other loops so one has to oscillate back to the control level of the other. Thus, with prior art ABC systems there can be noticeable blooming, darkening, brightening and flickering of the displayed image during x-ray beam attenuation changes and imaging system geometry changes.

The matter of keeping output image brightness constant is complicated by the interaction of selected x-ray tube exposure factors. X-ray tube anode-to-cathode mA depends mainly on the cathode or filament temperature while a constant kilovoltage (kV) is applied to the x-ray tube anode. At lower kilovoltage such as around 60 kV electron emission from the cathode is limited largely by space charge about the cathode. As applied kV is increased, as is necessary to penetrate more dense or thicker areas in a patient, the space charge effect is reduced and there is a non-linear relation between kV and x-ray intensity or x-ray photon output from the tube. Image brightness is directly proportional to x-ray tube mA and not directly proportional to applied kV. Brightness also varies as the square of the distance between the x-ray tube focal spot and the image plane.

Within an applied kV allowable range of 60 kV to 120 kV, x-ray tube mA is the preferred parameter to regulate for maintaining constant intensifier output image brightness during fluoroscopy since brightness is directly proportional to mA. X-ray tube photon output is directly proportional to mA. Image contrast increases with increasing tube mA and concurrent output photon intensity so that maximum information is obtainable from suitably high contrast images. There are, however, limits on the level of mA affected by the fact that the patient entrance dose rate must always be kept at or below 10 R/min. For fluoroscoping thick highly attenuating regions of the body, kV must be increased and mA decreased to maintain 10 R/min. Unfortunately, as kV and penetrating power of the x-ray photons increases, contrast in the image decreases. Thus, small differences in tissue density are less likely to be perceived.

Generally, prior practice has been to detect the need for more brightness and use a servo loop to automatically increase mA up to its available limit in an attempt to achieve the necessary brightness increase. In some system designs, kV is increased manually or automatically if the desired brightness level is not achievable with current control. If proper brightness cannot be obtained within the tube current, kV, SID and 10 R/min. constraints, the gain of the video camera is increased. Increasing video camera gain is the least desirable way of increasing brightness because noise is amplified as much as picture information, but no gain in information results because it is limited already by the limit on x-ray photon input to the patient's body. Prior art brightness control systems, adjusting mA, kV and video gain are essentially step functions which result in a lack of smooth unnoticeable transition from one function to another and, hence, cause noticeable flickering and increasing and decreasing brightness as x-ray attenuation and system geometry change during fluoroscopy.

SUMMARY OF THE INVENTION

An objective of the invention disclosed herein is to provide a new method and apparatus for controlling and maintaining x-ray image brightness constant during fluoroscopic and cine recording procedures.

A further objective is to provide for adjusting x-ray tube mA, kV and video gain on a priority basis in the stated order, but in a sense, concurrently with each other such that the primary effect on brightness is obtained most desirably with mA control, the secondary effect with kV control and a tertiary effect with the least desirable video gain control and in keeping patient entrance x-ray dose rate at no greater than 10 R/min.

Another objective is to eliminate all noticeable brightness changes even though there is a sudden fluoroscopic scan from more to less dense regions of the body or vice versa and even if there is a sudden change in the SID.

Another objective is to provide a brightness control system that allows mA control to be obtained in two ways; which are, allowing x-ray tube mA level to be obtained primarily by adjusting the level of current that is heating the filament in systems adapted exclusively for fluoroscopy and allowing tube mA level to be obtained by using a grid controlled x-ray tube and controlling the x-ray pulse duration during each frame as marked off by each video vertical blanking pulse in systems that do fluoroscopy and cinerecording.

According to the invention, brightness control is accomplished, using software or hardware, by having the effect of three servo loops. One primary radiation control loop, called the RAD CONTROL loop, gives priority to adjusting the current (mA) flowing through the x-ray tube. This loop is based on taking the ratio of a reference voltage signal with respect to a voltage signal corresponding to present image brightness. In the described embodiment, if the brightness ratio (BRT RATIO) is greater than 1, the image brightness is too low, if less than 1, brightness is too high and if equal to 1, brightness is correct. The ratio signal is processed and used to control the x-ray tube mA. Making the required mA change which appears to be called for may result in exceeding the available tube mA limits. Some brightness error may have to be overcome by changing the kV applied to the x-ray tube.

In a second loop, called the kV loop, a ratio is taken between a signal corresponding to a desired x-ray tube mA level or mA pulse width and the mA or RAD CONTROL value commanded by the above mentioned primary loop during the previous brightness sample period. This ratio indicates the error between the mA desired and the mA commanded by adjusting mA alone. The resulting RAD CONTROL ratio (RCR) is then multiplied by the BRT RATIO to produce a kV CONTROL RATIO. This ratio reflects the fact that if the brightness error which RAD CONTROL is required to correct by mA adjustment is large or small, then the proportion of the brightness to be corrected by kV adjustment is correspondingly larger or smaller.

The third loop is operative to alter the video camera gain to a degree governed by how much of the available mA range and of the available kV range are used up. In other words, the RAD CONTROL command and the kV command magnitudes constitute a prediction as to whether and how much video camera gain adjustment is necessary when kV and mA are so far along toward reaching their limits. In the video gain control loop, a ratio is taken of the RAD CONTROL value at the last command for the preceding sampling period (t−1) in respect to the maximum RAD CONTROL LIMIT. A ratio is taken of the brightness change resulting from the kV control command signal at (t−1) in respect to the maximum brightness factor limit. The results of these ratios are multiplied with the BRT RATIO and the result is the VG CONTROL command. This process results in increasing the video gain control (VG CONTROL) by a minimum amount, if any, to minimize noise amplification.

The system is adaptable to adding additional loops which produce commands that are functions of preceding loops and which are all based on sensing a single condition, namely, image brightness.

The manner in which the foregoing brightness control functions are achieved will be evident in the ensuing description of an embodiment of the invention in which reference will be made to the accompanying drawings.

DESCRIPTION OF A PREFERRED EMBODIMENT

Figure 1:
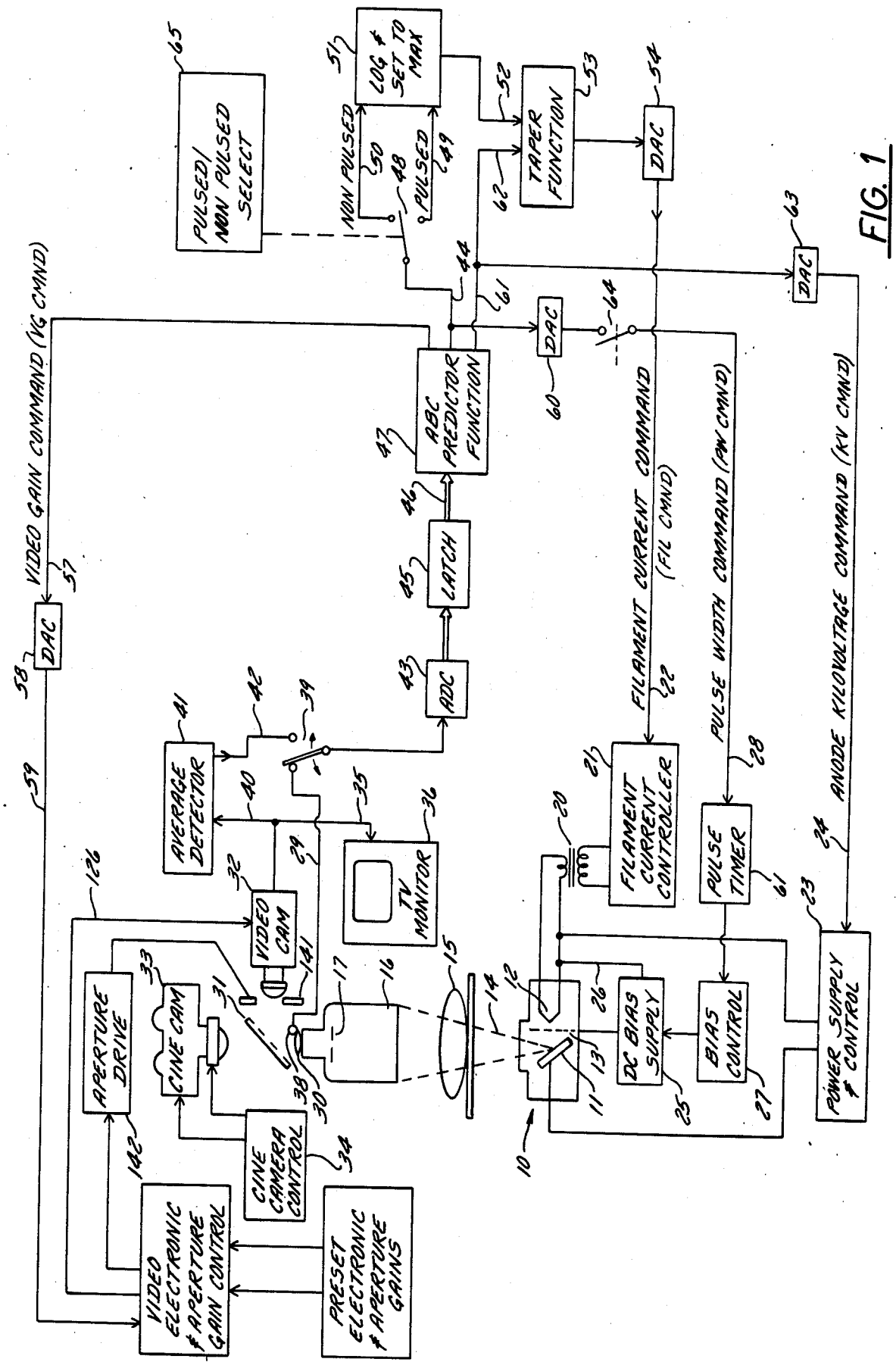
FIG. 1 is a block diagram of a diagnostic x-ray system in which the new automatic brightness controller is installed.

FIG. 1 is a functional block diagram of an x-ray cinerecording and fluoroscopy system in which the new automatic image brightness system is used.

Basically, conventional equipment is used to acquire x-ray images. Thus, there is an x-ray tube 10 having an anode target 11, a cathode filament 12 and a control grid 13 so as to be capable of functioning as a vacuum tube triode. From the electron beam focal spot on target 11, an x-ray beam 14 is projected through a patient represented by the ellipse marked 15. The resulting x-ray image is received in an image intensifier 16 and converted to a bright minified optical image appearing on the output phosphor 17 of image intensifier 16. The electron emissive x-ray tube filament 12 is heated by current supplied from the secondary winding of a filament transformer 20. A filament current controller or regulator 21 responds to the magnitude of filament current level command signals (FIL CMND), generated in accordance with the invention, that are input on line 22. One of many suitable filament current controls is described in the pending application of Relihan, et al, Ser. No. 569,179, filed Jan. 9, 1984, now U.S. Pat. No. 4,590,603 which is owned by the assignee of this application. The x-ray tube current, expressed in milliamperes (mA), flowing between the anode 11 and cathode filament 12 when kilovoltage is applied to the anode is dependent in part on the current flowing through filament 12 and on its corresponding temperature.

A peak kilovoltage (kV) applied between anode 11 and filament 12 to initiate an x-ray exposure is derived from the secondary winding of a step-up transformer, not shown, in an x-ray tube power supply and control system symbolized by the block marked 23. A basically conventional x-ray power supply may be used. Although the parts are not shown, it will be understood, by those knowledgable in x-ray systems, to comprise a single phase, but more commonly a 3-phase step-up transformer whose high kilovoltage secondary winding output is rectified and applied between the anode 11 and filament 12 of x-ray tube 10. The primary winding of the step-up transformer is supplied from a variable auto transformer in power supply block 23 such as one that is known by the trademark Volt-Pac and is marketed by General Electric Company.

As a practical matter, neither single phase nor 3-phase auto transformers are infinitely variable but apply voltage in steps to the primary of the step-up transformer between minimum and maximum permissible voltage limits. By way of example, in the embodiment of the invention described herein, the voltage steps supplied by the auto transformer to the primary of the 3-phase step-up transformer may be such that the kV applied to the x-ray tube anode will change in no less than one kV steps. It will be understood that kV as used herein implies peak kV (kVp) since it is the peak voltage or peak of the rectified voltage ripples that govern the peak energies of the x-ray photons emitted from the electron beam focal spot on the target 11 of x-ray tube 10.

It should be understood that the x-ray power supply and control 23 is conventional in the respect that it contains the switching devices for causing the kV to be applied to the anode of the x-ray tube and to be isolated from the anode to start and stop x-ray exposures, respectively, for continuous fluoroscopy or for pulsing the x-ray tube on and off for intervals within each video frame time as is required for cinerecording but is also applicable to fluoroscopy according to the present invention. A known type of servo system, not shown in the power supply and control block 23, can be used for varying the variable auto transformer output voltage. The servo system is, however, governed by an analog command signal (kV CMND) delivered over line 24 in FIG. 1. Adjusting kV is, of course, a common practice, but it is the degree to which the kV is varied and the manner in which it is varied relative to other system parameters to achieve automatic image brightness control that is one of the new features achieved with the present invention.

The invention uses two different methods of varying the x-ray tube mA besides varying other x-ray tube factors for achieving the brightness control function. For cinerecording, it is necessary to vary brightness by pulsing x-ray tube on and off in response to alternate applications of zero voltage and a high negative bias voltage to the control grid 13 of the x-ray tube within each consecutive video frame time so brightness will be varied in part by the average mA through the x-ray tube. Increasing pulse width, for example, increases the average mA through the x-ray tube.

X-ray tube 10 has the capability for being biased to cutoff. A dc bias voltage supply is represented by the block marked 25. The negative output voltage terminal of the bias supply connects to x-ray tube control grid 13. The positive side of the supply connects by way of a line 26 to the filament. Dc bias supplies for making the x-ray tube conductive and non-conductive, thereby producing x-ray pulses, are well-known in the art and need not be described in detail. It is sufficient to say that the bias supply contains the usual step-up transformer and rectifiers for producing a bias voltage on the order of minus 3000 volts relative to the x-ray tube filament When the negative bias voltage is applied to the grid, conduction by the x-ray tube is inhibited. Producing x-ray pulses of short duration and at a high frequency is necessary for performing cinerecording. Cinecamera frame rates may go as high as 140 frames per second in a case such as where the radiologist attempts to obtain an unblurred picture of a moving heart. Average current (mA) through the x-ray tube is controlled by regulating the widths of the x-ray pulses when operating in the cinerecording mode. Brightness must be adjusted very rapidly during cinerecording. The bias voltage source 25 is turned on and off by a bias control circuit which is represented by the block marked 27. The bias control circuitry 27 turns the bias supply 25 on and off at a rate and for pulse width durations governed by a pulse width command signal provided over a line 28.

Varying pulse width instead of filament current level can also be used in the fluorographic mode, according to the invention, besides being used for cinerecording. In systems that are equipped for cinerecording, brightness is governed by pulse width control for both cinerecording and fluorography.

A bias supply that could be used is described in Daniels, et al, U.S. Pat. No. 4,361,901, which is owned by the assignee of the present application.

The image on the image intensifier 16 output phosphor 17 is projected by way of an objective lens 30 to a dichroic mirror 31 which can direct the image into a video camera 32 or a cinecamera 33. The cinecamera control is symbolized by the block marked 34 and the video camera control is assumed to be within the video camera. When the video camera 32 is functioning as it is during a fluoroscopic scan of the patient, the video signals from the camera are conducted by way of a cable 35 to a television monitor 36 on whose screen 37 the image is continuously displayed. Two means for providing a signal indicative of the brightness of the x-ray image are provided. One is a photosensor 38 which is in a position to view the image intensifier output phosphor 17. Photosensor 38 is preferably activated when the system is in the cinerecording mode. It will be shown later how the photosensor is instrumental in maintaining the brightness of the image on phosphor 17 constant during recording with cinecamera 33. A signal indicative of the brightness of the phosphor is selectable by means of a switch 39, which when swung to the left as depicted in FIG. 1, supplies the analog signal sample indicative of brightness during the present brightness sampling frame or period to an analog-to-digital converter (ADC) 43.

An alternative signal representative of brightness is derived from the video camera 32. The video output signal from the camera is conducted by way of cable 40 to an average detector 41 which can be built into the camera housing. Detector 41 produces a signal indicative of the average brightness over the area of the video picture. The average detector is described in detail and shown in FIG. 3 of U.S. patent application Ser. No. 625,918 filed June 29, 1984, now U.S. Pat. No. 4,573,183 which is incorporated by reference in its entirety. This patent is owned by the assignee of this application. This signal is supplied by way of line 42 to switch 39 for being converted to a digital value in ADC 43 when the proper position of switch 38 is selected. By way of example and not limitation, the signal indicative of the brightness that the video camera detects is in the range of zero to one volt.

What has been described thus far is mostly conventional.

An important feature of the invention is that the x-ray tube mA, the kV applied to the x-ray tube anode and the gain of the video camera are all controlled and regulated by operating on a single sensed signal such as the brightness sample signal derived from photosensitive device 38 or video image average brightness derived from detector 41. After digitization in ADC 43, these samples which are taken at a synchronous rate are latched temporarily in a digital latch 45 from which they are transmitted by way of a bus 46 to a block 47 that is identified as an ABC (Automatic Brightness Control) predictor function. The structure and operations performed in this functional block will be described in great detail later. For the time being, it is sufficient to recognize that a digital signal, later called RAD CONTROL signal, indicative of the level to which the x-ray tube filament current must be adjusted or pulse width must be adjusted to maintain brightness constant is delivered on line 44 from ABC predictor 47 to a switch 48 which is a multiplexer in an actual embodiment and to a digital-to-analog converter (DAC) 54. The switch can connect the x-ray tube current controlling output signal from predictor 47 to either line 49 for operating in the pulsed x-ray tube current mode as for cinerecording and fluoroscopy or to line 50 for operating in the non-pulsed mode as is the case when the apparatus is limited to fluoroscopy. Switch 48 is operated with a selector 65 which also operates switch 64. Lines 49 and 50 are inputs to a block 51 labeled Log & Set to Max in which some signal processing is done as will be explained later in connection with describing the taper function which is performed in the block labeled 53. The taper function has an input line 52. The taper function assures that the x-ray dose on the entrance side of the patient does not exceed 10 R/min. during fluoroscopy. Exceeding this dose rate during cinerecording is permissible. The output from the taper function circuitry is input to a DAC 54 whose output is a filament current command analog signal which is supplied by way of line 22 to filament current controller 2I. The RAD CONTROL signal on predictor output line 44 is basically an x-ray tube current (mA) controlling signal. The RAD CONTROL signal is input to a DAC 60 which outputs an analog signal on line 28. This signal controls a pulse width timer 61 which regulates the x-ray tube bias voltage control 27. The predictor output signal (kV CMND) that is for dynamic adjustment of x-ray tube anode kV appears on line 61 and is one input to the taper function circuitry 53 where it is needed for maintaining patient x-ray entrance dose below 10 R/min. The command for controlling x-ray tube anode kV is converted to an analog signal in DAC 63 before it is sent to the x-ray tube power supply control 23. A switch 64 is opened when operating in the non-pulsed mode since x-ray tube mA is then governed by the FIL CMND signal on line 22. Switch 64 is operated with selector 65 in the upper right region of FIG. 1.

A significant feature of the system is that it is not simply x-ray tube mA that is adjusted when brightness should be reduced or increased. Let us say that the image intensifier was scanned over a patient from a low density to a high density and x-ray attenuating area. In such case, a large mA step or increase would seem to be required to bring brightness up to a desired level. This is what is done in prior art systems. It results in flickering and might not even be sufficient to get the proper brightness unless kV is increased independently. In accordance with the invention, the predictor upon sensing that the current adjustment apparently required would be so great so as to fall outside the high permissible limit, for instance, would cause a kV adjustment to be made. In other words, it would predict or anticipate that under instantaneous circumstances, kV adjustment will be necessary so it starts making it within a frame time concurrently with the generated filament current command. The predictor preferentially adjusts x-ray tube mA which desirably should be as high as possible to produce a maximum number of x-ray photons to thereby get the best image contrast without exceeding permissible filament current limits and without violating the proscription against having the patient entrance dose rate exceed 10 R per minute. In the fluoroscopic mode, as indicated earlier, the single signal detected for obtaining brightness control is a sample obtained from video signal average detector 41. In situations where a great increase in brightness is required because a very dense portion of the patient's body is being scanned, it is desirable to make, within limits, the x-ray tube mA adjustment and some kV adjustment before increasing video camera gain. kV should be raised no more than is necessary because as it is increased, image contrast suffers. However, if it is predicted that increasing mA and kV will not result in a constant image brightness as displayed on the TV monitor during fluoroscopy, the video camera gain must be adjusted. Increasing video camera gain is least desirable because, it does not result in producing any more information in the image and, furthermore, it does result in amplifying the noise which is undesirable. However, the fluoroscopist wants an image that is at a constant brightness level and exhibits no noticeable changes in brightness as the x-ray image intensifier 16 is moved from over one portion of the patient's anatomy to another.

From the single sample brightness signal that is obtained from average detector 41, predictor 47 not only provides the proper command signals for adjusting x-ray tube mA and kV but also anticipates the video camera gain that might be required and provides an output signal which is a command to the video camera 32 to adjust its gain. This digital signal is transmitted by way of line 57 to a DAC 58 from which it is delivered by way of line 59 to the controls in the video camera housing.

It will appear subsequently that although one video gain command (VG CMND) signal is delivered to video camera 59, it has its own servo system for preferentially adjusting the f-stop of the camera aperture 141 on first priority when a gain increase is called for and giving electronic gain second priority. In this way, amplification of video noise is limited to the extent possible.

Figure 2:
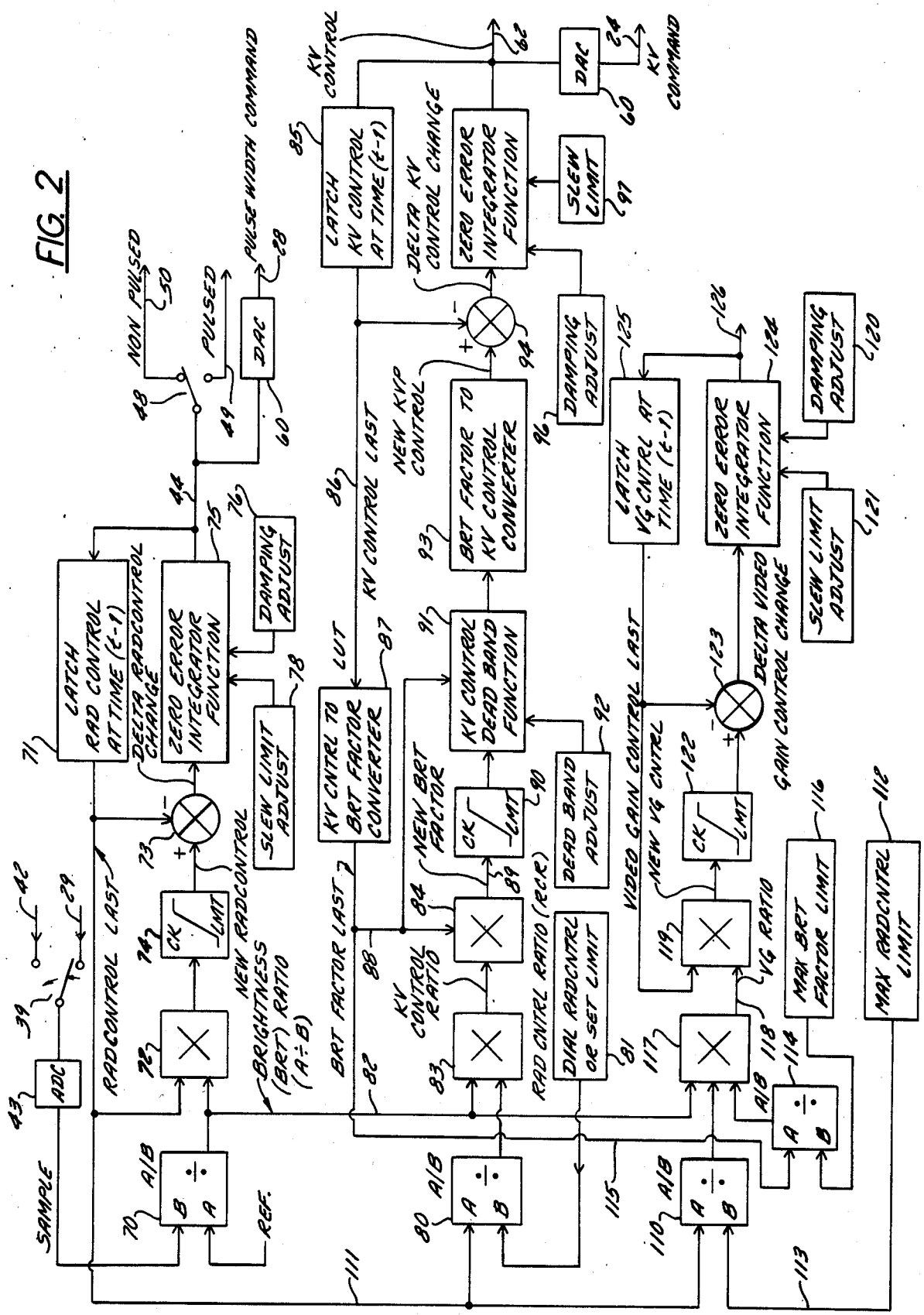
FIG. 2 is a diagram showing the parts of the predictor processor shown in block form in FIG. 1.

Refer now to FIG. 2 for a description of circuitry and operations that achieve being able to predict by sensing only one variable, namely, present image brightness, and use this single point to control the amount of adjustment of x-ray tube mA, kV and video camera gain required to produce an image of constant brightness without having noticeable brightness transitions.

Assume that a fluoroscopic examination is to be conducted. In such case, switch 39 in the upper left region of FIG. 2 will connect line 42 to the input of ADC 43. The fluoroscopic image derived by the video camera 32 from the image intensifier 16 is displayed on screen 37 of the TV monitor. Average detector 41 is a known circuit for generating an analog signal representative of the average brightness of the image viewed by the video camera. This brightness sample is the only measurement required to govern mA, kV and video gain to obtain constant image brightness according to the invention. FIG. 2 is collectively called a predictor processor which was represented by the block marked 47 in FIG. 1.

In FIG. 2, the digitized brightness sample signal from the average detector 41 is supplied to input B of a divider 70. A stable digitized reference voltage signal is supplied to the B input of divider 70. By way of example and not limitation and the for sake of the clarity that results from use of concrete numbers, assume that the reference signal is 2 volts. Thus, if A/B is greater than 1, it means that the sample is less than 2 volts and that brightness is too low. If A/B is less than 1, brightness is too high. If A/B is equal to 1, the set or desired brightness exists.

The brightness ratio (BRT RATIO): BRT REFERENCE/BRT SAMPLE is used to develop the basic signal for controlling x-ray tube mA and is called filament command (FIL CMND) or radiation control (RAD CONTROL) which is the first priority and primary signal for controlling brightness. The RAD CONTROL LOOP is the PRIMARY CONTROL LOOP. It is desirable to keep x-ray tube mA or current as high as is permissible ordinarily because the higher the current the higher x-ray photon output of the x-ray tube. High photon intensity results in high image contrast and low image mottling which is desirable.

Assume for the moment that there has been at least one video frame so there is an existing RAD CONTROL signal that brought about the image brightness that has just been sampled during the present image frame. Sampling is synchronized with the vertical blanking pulse of the video camera in the case of fluoroscopy. The last digital RAD CONTROL signal from the immediately preceding sample period is stored in a latch 71 which is labeled RAD CONTROL at (t−1), 71.

In the present video frame, the new BRT RATIO output from divider 70 is one input to a multiplier 72. Assume the instant sample shows a brightness error and BRT at (t−1) is known. Since x-ray tube mA is represented by the RAD CONTROL output signal and image brightness is directly proportional to mA, the last RAD CONTROL signal at (t−1) is multiplied by the new BRT RATIO. This results in a new RAD CONTROL command signal. This operation is carried on continuously whether the x-ray image intensifier is in motion, that is, scanning over the patient or at rest. Every recalculation must be done within about 2 ms at the beginning of every video frame.

There are, of course, tube mA limits that must not be exceeded and there are limits as to how fast the x-ray tube mA can be changed. So the RAD CONTROL loop in the predictor processor requires slew limiting and damping. For these objectives, the difference between the new RAD CONTROL and the last RAD CONTROL at (t−1) is taken in a subtractor function 73. The difference represents the DELTA CHANGE in the RAD CONTROL signal required. There is a limit to the magnitude in the x-ray tube mA and, hence, to the RAD CONTROL command signal. Whether the new RAD CONTROL command exceeds the limit is checked in a functional block labeled CK LMT and given reference numeral 74. The limit is checked before the subtraction is made.

Making a very large change in RAD CONTROL within a single video frame, if such were possible, would most likely affect RAD CONTROL loop stability. Also, an assumption is made that the predicted amount of RAD CONTROL or FL CMND change is excessive. Thus, there is a programmable DAMPING FACTOR generated in and selectable for most stable performance in a block marked 76 and labeled DAMPING ADJUST. The DAMPING FACTOR is a fraction which will usually be in a range of 0.5 to 0.9. The calculated new RAD CONTROL command is multiplied by the selected DAMPING FACTOR in a block 75 labeled zero error integrator function. This function compares the DELTA CHANGE between the new prediction and the present command. A damping gain less than unity is applied to this DELTA CHANGE to minimize overshoot and to meet proper settling times. A slew limit factor symbolized by the block marked 78 is used to keep the predicted change within limits that the system can respond to at a given video or cinecamera frame rate. The proper gain must be used to maintain resolution for small changes in brightness and to allow the system to operate with zero error when a large damping value is needed. The result of the multiplication is the DELTA CHANGE relative to the RAD CONTROL command at (t−1) and the result is that the DELTA CHANGE is made smaller.

The new RAD CONTROL CMND appears on line 44 and is supplied in digital form to switch 48 and to DAC 60 which outputs the RAD CONTROL command on line 28 as the pulse width command for pulsed operation and on line 50 for non-pulsed operation.

In an actual embodiment, values are scaled up and scaled down at the input and output of each loop. The reason is that calculations for the brightness adjustment signals must be done during the video vertical blanking interval in the case where the video camera is used for timing and during the film advance interval where timing is synchronized with the film advance rate. Calculations are performed using integer mathematics to obtain the necessary speed. In integer mathematics, the numbers are rounded off so a decimal value such as 1.25 would round off at 1.0 which would reduce accuracy. Scaling up by 100, for example, would simply convert 1.25 to 125.

Assume a condition now where a large thick patient is in the x-ray beam or that the image intensifier has just scanned over a body region containing bone so as to increase x-ray attenuation and reduce image brightness. Consider a case where the BRT RATIO, A/B is 4, meaning brightness is four times too low. Assume the x-ray tube is on continuously (nonpulsed) in this case. Assume the fluoroscopy scan began when the x-ray power supply was applying 60 kV to the anode of the x-ray tube. So if BRT RATIO was four times too low and the command was multiplied by 4, mA might go up to the limit of available kV. RAD CONTROL would make the mA go as high as would be required to return the BRT RATIO to unity or up to the available mA limit for one sample period to bring about correct brightness within one sample period. Then within a few frames or sampling periods kV and possibly video gain would be fully adjusted and mA would come down.

Figure 3:
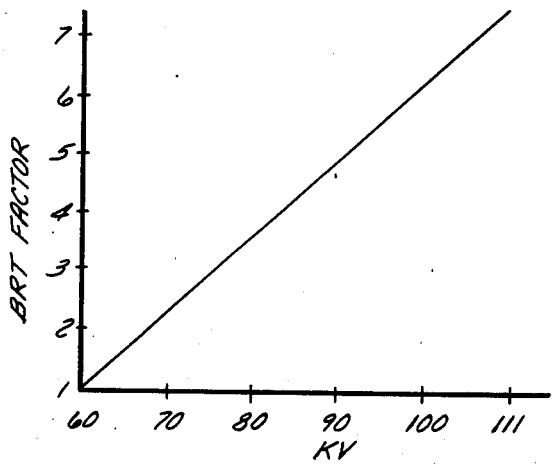
FIG. 3 is a graph showing the relationship between kV applied to the x-ray tube anode and image brightness factor (BRT FACTOR) which is useful to explain operation of the invention.

There is a kV value above the minimum 60 kV in this embodiment which, if applied to the x-ray tube anode at this time will tend to increase the image brightness further. If the higher kV is applied, the image will get too bright and the next sample will be high and the BRT RATIO will be less than unity. This will change the RAD CONTROL signal level and, hence, the x-ray tube mA will be driven down. Having mA go over a preset maximum limit creates an error for kV which forces mA back down to a set or selected limit according to the present invention. BRT FACTOR is related to applied kV as illustrated in the FIG. 3 graph which is exemplary of one system. The minimum kV is 60 kV. Anything lower than 60 kV would be so severely attenuated in the body that x-ray photons emerging from the body would be insufficient to form an image of all anatomical details in the x-ray beam field. kV and x-ray photon output are not proportional because of the space charge effect. In the FIG. 3 plot, to double the BRT FACTOR from 1 to 2, kV must be increased from 60 kV to 70 kV.

In the example given in the preceeding paragraph, when the error factor or BRT RATIO was 4, the x-ray tube mA could only be corrected by a factor of 2 on that error. So the additional error is compensated by modifying the kV command. Thus, the resulting change in mA and kV factors would yield a BRT FACTOR of 4.

At extremely small pulse-widths, the direct relationships between the width of the x-ray pulse and image brightness become non-linear. This can cause the automatic brightness control (ABC) system to become unstable because small changes in pulse-width result in large changes in image brightness. As the x-ray tube grid bias pulse-width approaches x-ray pulse rise time or turn-on time, the effect becomes more pronounced and x-ray intensity is not sufficiently constant throughout the pulsed exposure. For long exposures, image brightness is proportional to the area under the curve plotting peak x-ray intensity versus exposure time. As stated, for short exposures x-ray intensity is not proportional to bias pulse-width. In fact, the system response, that is, the rise to full x-radiation output may still be in progress while the pulse that initiated the response may have expired. Thus, full exposure time per pulse may never be attained and image brightness will not be proportional to pulse width as it should be. The problem is solved by the development depicted in FIG. 6.

Figure 6:
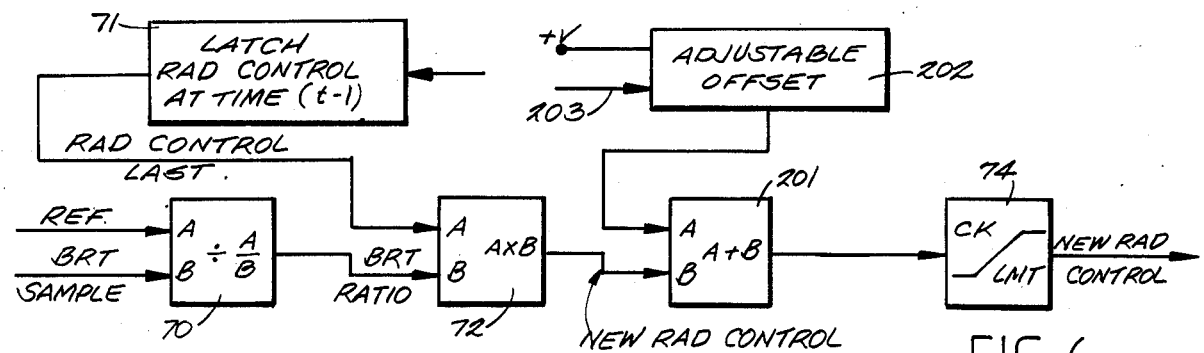
FIG. 6 is a modification of the brightness control system wherein means are provided for adding an offset to a pulse-width control value to maintain system stability when pulse-width approaches system rise time.

The circuit in FIG. 6 provides for solving the short pulse-width non-linearity problem by adding a fixed or adjustable offset voltage signal to the NEW RAD CONTROL signal. The offset is added after NEW RAD CONTROL is computed in the primary loop. Actually what is added is a digital signal that corresponds to time which means that when the computed RAD CONTROL signal corresponds to pulse-widths that are short and might fall within normal system rise time, the pulse durations are extended slightly so they are longer than system rise time. FIG. 6 is derived from FIG. 2 but some components are added. Components that are the same in the two figures are given the same reference numerals.

In FIG. 6, the NEW RAD CONTROL signal is computed using divider 70 and multiplier 72 as in the basic FIG. 2 circuit. An adder 201 is connected in FIG. 6 between multiplier 72 and limiter 74. The computed NEW RAD CONTROL signal is supplied to input B of adder 201. A digital number corresponding to the desired amount of time that the short pulses are to be extended is provided by an offset value generator marked 202. The amount of offset is adjustable and in the actual embodiment is adjusted in correspondence with the computed NEW RAD CONTROL value in response to a signal representative of that value fed in to offset generator 202 on line 203. The offset value is supplied to adder 201 input A in FIG. 6. The sum of the NEW RAD CONTROL signal representative of the desired or selected pulse-width and the offset is then input to the limiter 74 as was the case in FIG. 2. With the FIG. 2 circuit the pulse-width prediction portion of the brightness control system will more closely model actual system response.

As will be elaborated later, mA through the x-ray tube is related exponentially to filament current and its temperature. A 1 to 1 relation between image brightness and tube mA must be established. This is obtained by taking the logarithm of the mA command. Filament drive control is only logarithmic for nonpulsed fluoroscopy. In the pulsed x-ray cinerecording mode, control of x-ray tube mA is done by applying and removing negative biasing voltage to the grid of the x-ray tube during each exposure frame. The pulse width is directly proportional to x-ray tube mA. The x-ray tube mA is held at a fixed value in the pulsed cinerecording mode.

In accordance with the invention, in the fluoroscopic mode if a brightness error occurs, a calculation is made to determine the change that must be made in the FIL CMND to correct the brightness error. The correction is not made in a single step or several steps as in the prior art up to the mA limit whereupon kV adjustment begins and runs to its limit at which time video camera gain adjustment starts. Rather, in the new brightness controller, when a brightness error is detected and the BRT RATIO is determined, the tube mA command is adjusted and a correction is made in the kV command at the outset. The size of the kV command correction depends on the BRT RATIO or the size of the error. In other words, the kV correction required to comply with the detected brightness error as manifested by the FIL CMND is predicted at the outset so the whole kV change is not made at once and rapid changes in image contrast that would result from large step kV changes are avoided. If the required correction is large, part of the error correction will be made by adjusting video gain at the outset, too.

Kv control will now be discussed. A brightness error must be present to cause kV to be driven up or down. A prediction is made as to the proportion or ratio of the brightness error that is to be corrected by adjusting x-ray tube applied kV. kV is adjusted in response to the developed kV COMMAND signal concurrently with the mA adjustment dictated by the RAD CONTROL or filament current command. If operation is in the fluoroscopic or continuous mA mode rather than the cinerecording or pulsed mA mode, a video gain command may also be developed, but will not be significant unless there is a brightness error which cannot be corrected within the available x-ray tube mA and kV ranges or limits. In any case, the mA, kV and video gain (VG) commands are developed and executed simultaneously for each brightness sample period.

The kV loop begins with a divider 80. The A input to the divider is RAD CONTROL LAST (RCL) which is the digital RAD CONTROL signal stored in latch 71 for the preceeding BRT sample at (t−1) where (t) is the time of the present sample period. The B input to divider 80 is a manually selected or so called DIALED RAD CONTROL signal developed in a block marked 81. In the alternative, the B input can be supplied with a fixed SET LIMIT signal which usually corresponds to 95% of maximum mA in the non-pulsed fluoroscopic mode and 95% of maximum pulse width in the pulsed fluoroscopic mode. Under conditions where the kV signal is above the minimum allowed (60 kV) the RAD CONTROL or primary loop maintains a signal level equal to 95% of its maximum value. The extra 5% allows the primary loop to correct for small underbrightness conditions without having to wait for the usually slower kV response. In this way mA or pulse width changes can correct for small brightness errors immediately and at the same time produce an error proportional to the ratio of the set limit in the last predicted RAD CONTROL command which will cause kV to move, creating a small brightness error, until the RAD CONTROL signal is forced back to its set limit again. The DIALED RAD CONTROL signal is used in connection with performing cinerecording in the pulsed x-ray tube mA mode. In the pulsed mode, image brightness depends on average mA. As pulse width increases, x-ray tube mA increases and as pulse width decreases mA decreases. Thus, mA is related to pulse width and pulse width is selectable by the user. However, in the pulse mode, filament current, hence, electron emissivity is held constant so the mA through the tube is at a fixed level when conductive or biased on and only the pulse durations are varied. An example of the value of providing DIALED RAD CONTROL is where the user might want to cinerecord at a rate sufficiently fast to provide the effect of stopping motion of the heart, for instance. As an example, assume that the user wants a pulse width of no more than 5 ms to stop motion, a signal corresponding to 5 ms is entered or dialed into input B of divider 80. If operation is in the non-pulsed fluoroscopic mode, a fixed SET LIMIT signal developed in block 81 is applied to input B of divider 80. A SET LIMIT signal sets the x-ray tube mA limit.

The RAD CONTROL loop is indifferent to whether tube mA is varied continuously or as an average current resulting from varying pulse width. This loop is governed by detected image brightness in each sample period and it makes no difference how the RAD CONTROL output or FIL CMND signal is processed later to bring about te correct brightness level.

In FIG. 2, divider 80 takes the ratio of A to B, that is, the ratio of RAD CONTROL at (t−1) with respect to DIALED RAD CONTROL. The result is a RAD CONTROL RATIO (RCR). This represents the error between DIALED RAD CONTROL and what the effective tube mA actually was at (t−1). Now, the amount by which kV must be altered to cause an x-ray tube mA corresponding indirectly to 5 ms x-ray exposure is determined by the kV CONTROL RATIO which is obtained from the product of the BRT RATIO 82 and the RCR. BRT RATIO is used in the RAD CONTROL loop, the kV loop and the VG loop and is only calculated once. BRT RATIO is supplied by way of digital line 82 to one input of a multiplier 83. The result of multiplication is the kV CONTROL RATIO.

If pulse width represented by DIALED RAD CONTROL and RAD CONTROL at (t−1) differ, the ratio will be other than 1 and the ratio is processed further and is used to alter x-ray tube kV.

Where the RAD CONTROL loop only detects a brightness error, the kV loop will detect the brightness error and also an error due to how far the pulse width differs from the dialed pulse width that the user wants for the particular fluoroscopic procedure.

A numerical example can be clarifying. Assume a 5 ms pulse width is selected or dialed in. RAD CONTROL may be commanded above tube mA corresponding to the selected 5 ms value to quickly correct for brightness changes. For example, at an arbitrary starting time the x-ray brightness loop is settled with a pulse width of 5 ms. A large increase in x-ray attenuation causes the brightness to be cut in half and is sampled in the next sampling period. This event would result in a BRIGHTNESS RATIO of 2 and a predicted pulse width change of 5 ms resulting in a new commanded pulse width of 10 ms. Brightness would again be correct because RAD CONTROL would increase as to obtain proper brightness at the next exposure. Since in the next sampling period RAD CONTROL predicted 10 ms, an error of 10/5 (RCR) or 2 results because 5 is the selected pulse width. This is a positive error to the kV loop, therefore the error would cause the kV to be increased. The kV change would cause excessive brightness for the current sample period. On the first pass through the RAD CONTROL loop, the RAD CONTROL signal would dictate that the tube mA in terms of pulse width should be increased because the BRT RATIO indicates low brightness. After the first sample period ends, the RAD CONTROL signal at (t−1) was stored in latch 71 as RAD CONTROL LAST (RCL) and it was a value that called for increasing brightness to a tube current corresponding to 10 ms. Now, during the present sampling period the RCL is compared to DIALED RAD CONTROL in divider 80. From the resulting RAD CONTROL RATIO (RCR) it therefore appears to the kV loop that brightness is too low since RCL corresponds to 10 ms and DIALED RAD CONTROL is set at 5 ms. Now, the RAD CONTROL ratio output from divider 80 is multiplied by a brightness ratio of 1 in multiplier 83 and the result is a kV CONTROL RATIO of 2. After further processing, as will be explained, the kV CONTROL RATIO will cause kV to increase to correct for the RCR error. The effect of any kV increment is to increase the brightness a small amount during those subsequent sample periods that kV is increased. Now, the BRT RATIO detected by the RAD CONTROL loop indicates above reference brightness and the RAD CONTROL loop predicts a command that will cause pulse width and brightness to decrease. Within a few sample periods, the RAD CONTROL signal will decrease to a level where RAD CONTROL LAST on the input of divider 80 will reach the value of the DIALED RAD CONTROL input to divider 80. The kV value commanded will be that which achieves proper brightness without exceeding the dialed 5 ms pulse width.

To summarize, the RAD CONTROL command exceeded the dialed value so an error was indicated to the kV loop. kV increased and caused a small over brightness error. The RAD CONTROL loop then detects the high brightness and the RAD CONTROL COMMAND decreases until BRT RATIO is substantially 1 and there is no more brightness error. kV was commanded to increase until the kV ratio reached a value of substantially 1.

Ostensible excessive brightness prevails only while the loops are settling out and this would only be a few sample periods. No changes in image brightness would be perceptible because the RAD CONTROL loop sets the new pulse width and average tube mA value instantly. Brightness on the video monitor screen 37 tends to be constant as kV and RAD CONTROL signals gradually change together.

Brightness is not directly proportional to kV, it is a function of kV dependent on the particular x-ray tube used. For example, the kV CONTROL RATIO out of multiplier 83 might call for anywhere from 1 to 7 times brightness change but the kV would not correspond. The plot for brightness factor (BRT FACTOR) versus tube anode kV for one x-ray tube model is shown in FIG. 3. The brightness factor is normalized for a kV range of 60 to 120. If kV is set at 60 with a BRT FACTOR of 1 and it is desired to double brightness to a factor of 2, the kV would have to be increased to about 68 kV, for example, for the particular tube. If the BRT FACTOR were 4, about 83 kV would be applied.

In the FIG. 2 kV loop, the product of the previous sample period BRT RATIO from the RAD CONTROL loop and the RAD CONTROL/DIALED RAD CONTROL is called the kV CONTROL RATIO and is output from multiplier 83. Again, as in the RAD CONTROL loop, the new kV CONTROL RATIO command is multiplied in multiplier 84 by the kV CONTROL value at (t−1), but not directly since it is necessary to convert the kV CONTROL value into BRT FACTOR terms because of the lack of direct proportionality between brightness and kV. The kV CONTROL at (t−1) is stored in latch 85 and is an address to the look-up table (LUT) which is labeled kV CONTROL TO BRIGHTNESS FACTOR CONVERTER 87. The addressed BRT FACTOR corresponding to the kV CONTROL LAST at (t−1) from latch 85 is supplied by way of line 88 to multiplier 84. The product of multiplier 84 appearing on line 89, that is, the NEW BRT FACTOR is input to a circuitry block marked 90 wherein a check is made to keep the requested BRT FACTOR within the available kV range. In the kV loop there is a kV CONTROL DEAD BAND FUNCTION represented by the block marked 91 and a DEAD BAND ADJUST BLOCK marked 92 which will be disregarded for the moment. Thus, the NEW BRT FACTOR is passed through block 91 to a block 93 which is labeled BRT FACTOR to kV CONTROL converter and is marked 93. This block is a look-up table that is the converse of LUT 87 and which is used to convert BRT FACTOR back to the new kV CONTROL. The new kV CONTROL represents that value of kV, which if commanded, would achieve proper brightness with RAD CONTROL set to the dial value.

Now, as in the RAD CONTROL loop, the delta change is found again. In the new kV loop, delta change is the kV CONTROL minus kV CONTROL LAST at (t−1). The kv CONTROL COMMAND from the previous frame (kV CONTROL LAST) is subtracted from NEW kV CONTROL in subtracter 94. The delta change is again input to a ZERO ERROR INTEGRATOR FUNCTION represented by the block marked 95. This function uses the delta change in the kV CONTROL resulting from the NEW kV CONTROL - kV CONTROL LAST as its input. A damping gain less than unity is stored in DAMPING ADJUST block 96 and this gain factor is applied to the delta change to minimize overshoot and induce proper settling times. A SLEW LIMIT factor represented by the block 97 is used to keep the change within limits that the system can respond to at a given frame or sample rate. The proper gain must be used to maintain resolution for small changes and allow the system to operate with zero error when a large damping value is needed.

By way of example, say that the kV CONTROL RATIO in the kV loop had a value of 2 which would call for doubling of brightness from a predicted kV change. If at the time of the previous sample period exposure the kV CONTROL value was 60, the system uses the FIG. 3 graph where it is evident that a BRT FACTOR of 2 corresponds to a new kV of about 68 kV. This delta change of 8 kV might be beyond the slew rate or rate of change of the kV power supply but by checking and making slewing and damping modifications the real kV change is produced and this may result in a command to change less than 8 kV in one sampling. It may take a few frames or sampling periods to reach 68 kV but brightness of the image on the video monitor screen will appear constant because of the quick correction made in x-ray tube mA by the RAD CONTROL command. The kV CONTROL signal is sent out on line 62 which is an input to the taper function circuit as shown in FIG. 1.

Changes in the kV applied to the anode of the x-ray tube do not occur instantaneously or coincidentally upon receipt by the x-ray power supply of a new kV command signal. When the x-ray power supply uses an autotransformer which has voltage taps that are connected to the primary of the high kV step-up transformer and are selected by a servo system motor it takes some time to shift taps. Other high voltage sources also experience some delay between a command to change and completion of the change. Predictive brightness control systems would oscillate when kV changes are commanded that are larger than the servo loop can respond to in a given sample period.

Figure 9:
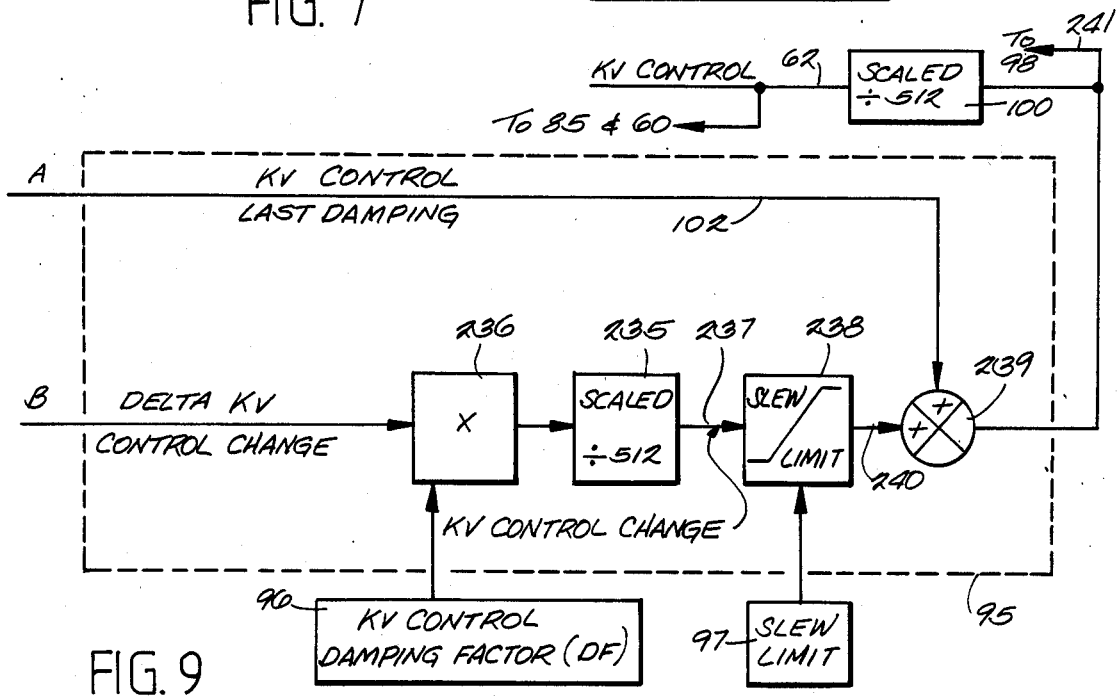
FIG. 9 is a modification for inhibiting changes in kV applied to the x-ray tube whenever the signal commanding the change is smaller than the steps to which the kV supply is quantized.

In accordance with the invention, the zero error integrator function 95 shown in block form in FIG. 2 and in more detail in FIG. 9 eliminates large command signal oscillations and provides small signal stability. The zero error integration function 95 is in a subsystem which includes a digital value scaler 99, subtracter 94, one field or sample delay device 98, a scaler 100, a source of kV CONTROL DAMPING FACTORS (DF) 96 and a slew limit element 97 as shown in FIG. 2.

In operation, referring to FIG. 2, subtracter 94 calculates the difference between the NEW kV CONTROL value that was predicted and the kV CONTROL LAST value which in FIG. 2 is called kV CONTROL LAST DAMPING because this value is simply a scaled up version of the last kV CONTROL that went out to the kV generator or power supply 23. The calculated difference is designated the DELTA kV CONTROL CHANGE and it is sent by way of the line marked B in FIG. 2 as an input to the zero error integrator 95 as is also the case in FIG. 9. The whole integrator 95 function utilizes scaled up values. Hence, at the outset the new kV CONTROL has been scaled up by a scaler 99 in FIG. 2 before the DELTA kV CONTROL CHANGE is calculated by subtracter 94. By way of example and not limitation, the NEW kV CONTROL value is scaled up by a factor of 512 with scaler 99 in practice. A greater or somewhat smaller scale could be used. In FIG. 2, after the kV CONTROL signal exits from the zero error integrator function 95, the signal is scaled down again with a divider 100 that divides by 512 to be consistent in this case to bring the kV CONTROL signal back to its value at the output of scaler 99 in which the signal was multiplied by 512. Thus the kV CONTROL signal is entered into the latch 85 for kV CONTROL AT TIME (t−1). The kV CONTROL signal is also outputted to perform the kV controlling function on line 62.

Consider the integrator 95 diagrammed in more detail in FIG. 9. One of its functions is to integrate or add and subtract increases and decreases in the kV CONTROL signal which are so small that they would fall inside of two kV supply quantization levels or would be delayed too much in execution because of the slow response of the kV supply.

The integrator function 95 in FIG. 9 has an input B for the DELTA kV CONTROL CHANGE and an input A for the kV CONTROL LAST (DAMPING) value which is scaled up. The loop is to be slowed down, that is, its band width will be made smaller. Function 95 takes a fraction of the DELTA kV CONTROL CHANGE. In this digital system this is done by using a kV CONTROL DAMPING FACTOR (DF) source 96 and a scaler or divider 235. Scaling is done to avoid loss of small kV CONTROL signal changes. The fraction of the DELTA kV CONTROL CHANGE taken can be different for some systems. In this example, a damping factor of 1 is supplied from DF source 96 to a multiplier 236 so DELTA kV CONTROL CHANGE is multiplied by 1 (one). It is then divided by 512 in divider 235. The result on output 237 is 1/512 of the digital value representing DELTA kV CONTROL CHANGE. Disregarding the kV CONTROL SLEW LIMIT 238 for the moment, the fraction is then input to an adder 239 by way of line 240. The other input to adder 239 is the kV CONTROL LAST (DAMPING). The result of the addition is sent by way of line 241 to a latch which is labeled 1 field delay 98. Latch 98 stores the result which is actually kV CONTROL LAST insofar as the integrator 95 is concerned. It will be evident that the integrator is repeatedly adding or subtracting small fractional changes or DELTA CHANGES in the kV CONTROL value to the kV CONTROL LAST (DAMPING) value so small changes in this value, which could not cause the kV CONTROL to respond anyway, are saved until a DELTA kV CONTROL CHANGE comes along which when added to the non-responsive fractional changes that are summed up as kV CONTROL LAST is large enough to bring about a kV supply response. It should be observed that the output of adder 239 is not only stored on a field after field basis in the 1 field delay 98 but the fractional result is also added to kV CONTROL AT TIME (t−1) in latch 85 of the kV control loop. Since the zero error integrator function 95 determines the value of kV CONTROL AT TIME (t−1) in latch 85, it will be evident that if there would be a sudden very large change in BRT RATIO due to x-ray scanning at an interface of poorly attenuating soft tissue and highly attenuating bone, the large change in kV CONTROL to change brightness which this should bring about will not occur in one TV field or one sample period. This is so because the zero error integrator only allows changes in kV that can be accommodated by the system and are only fractions of the total huge change in kV that might otherwise occur at one time. This would cause noticeable flicker which, in accordance with the invention, is obviated.

It should be observed in FIG. 9 that after the kV CONTROL CHANGE with damping is calculated and is represented by a fraction of the value of the DELTA kV CONTROL CHANGE, the calculated fractional value is input to a slew limit filter device 238. The slew limit function works in conjunction with the damping factor to take care of large signal changes. If a large kV change would be called for because of quickly switching the x-ray beam between a high and a low attenuating region in the body it is necessary to limit the kV CONTROL value to a value that is not beyond the response rate of the adjustable kV supply. By way of example, assume that the kV applied to the x-ray tube anode happened to be 120 kV. Next the x-ray beam is scanned to where image contrast would be satisfactory only if kV dropped down to 60 kV. This could yield a DELTA CHANGE equivalent to 60 kV. Now, if the damping factor were 0.5, for instance, the DELTA CHANGE would still be 30 kV which is still too large to be adjusted in one or even a few image frame times. Assuming the video frame rate and, hence, the brightness sample rate were 60 frames per second and the kV source can take 1 kV steps. Then the slew limit 238 would be set to allow a maximum change of 1 kV at one time. So 60 frames or 1 second may have to elapse while the brightness control is settling on the desired kV CONTROL value. The box 97 is a source of slew limit values which can be selected for setting the slew limiter 238.

Another problem with x-ray high voltage power supplies or generators is that system rise time causes the effective x-ray pulse time to become erratic, particularly when pulse width command (PW CMND) approaches system rise time. Earlier in this specification, in connection with FIG. 6, there was a discussion of one method of overcoming the effect on non-linearity between very small commanded pulse widths and image brightness. The method involved combining NEW RAD CONTROL with an offset.

During certain conditions, system rise time may become dynamic, that is, rise time may vary from one exposure to the next by small values. This is especially true if the desired pulse-width is only a portion of system rise time. Under these conditions the slope of the kV waveform may become dynamic which will cause a pulse-width predictor to oscillate. Even predictors that have been corrected with an offset as mentioned above may oscillate as the amount of offset needed changes slightly from exposure to exposure. Possible reasons for these small non-linearities are x-ray tube temperature variations, high kV cable capacitance and finite pulse-width generator resolution.

When the RAD CONTROL loop yields a pulse-width command that should cause the sample and reference values to be equal and cause the BRT RATIO output from divider 70 in FIG. 2 to equal 1, the ratio will not ordinarily equal exactly 1 because of the system errors. However, the high gain loops will try to correct repeatedly for such errors and the result is overshoot and undershoot or oscillation. When pulse-widths are large the problem is not very significant because the oscillations are a relatively small percentage of the whole. When parts of a body having low x-ray attenuation are in the x-ray beam the kV may be run down to its lower limit such as 60 kV to limit brightness and the pulse-widths, governed by RAD CONTROL values, may have to become very narrow to hold brightness where it should be. But short pulse-widths fall to a large extent within the rise time of the system and oscillations are likely to occur because the amounts of correction needed are a large percentage of the pulse durations. Corrections of small absolute values but large percentages of the pulse-widths would cause wide swings in brightness during short pulse-width exposures. When infants are examined pulse-widths are small because of their low x-ray attenuation so pulse-width and, hence, brightness stability is important. In digital subtraction angiography if brightness is not stable between consecutive exposures, the difference image resulting from subtracting a mask view from a view in which an x-ray opaque medium is in the field may have brightness differences which overwhelm image opacity differences so no useful information will be obtained.

Figure 12:
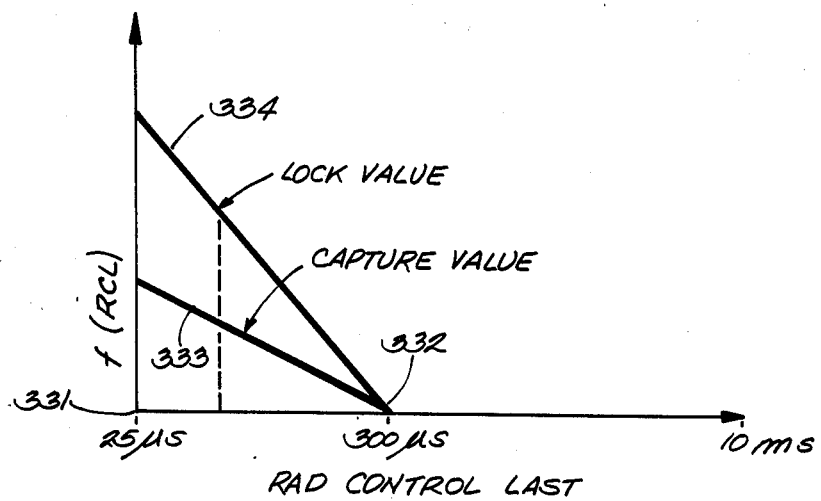
FIG. 12 is a plot of curves useful for describing the principles and functions underlying the preceding figure.
Figure 11:
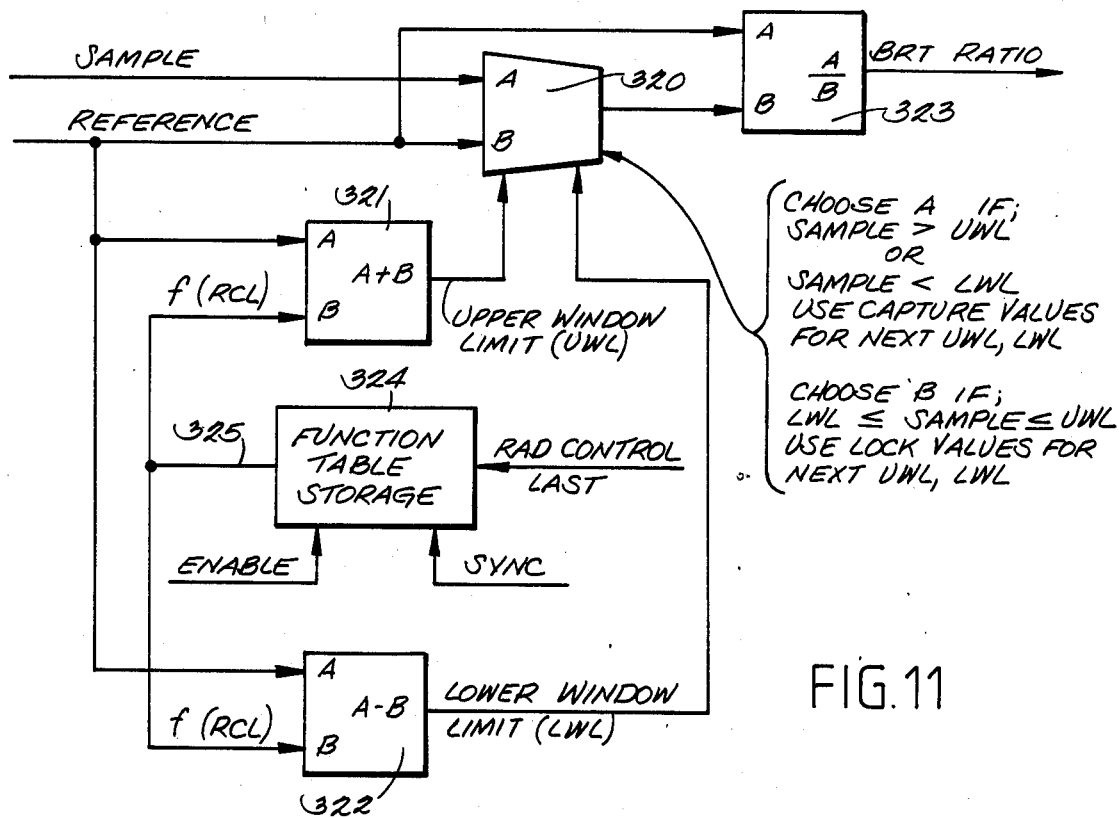
FIG. 11 is a functionality for maintaining constant image brightness and system stability when extremely short x-ray be current pulses are commanded.

The functionality shown in FIG. 11 uniquely provides for stable pulse-widths when the widths prescribed by the brightness control loop are small and at other wider widths, too. FIG. 12 is pertinent to the FIG. 11 functionality.

The functionality in FIG. 11 is used in place of divider 70 in FIG. 2 as in both cases the output is the BRIGHTNESS RATIO.

In FIG. 11 the digital value representing the sample brightness is applied to input A of a selector 320. The reference value is applied to input B. A window is determined and the reference value is centered between the upper and lower limits of the window. The upper window limit is determined with an adder functional block 321. The stable reference value is applied to input A of adder 321 and a function of RAD CONTROL LAST, f(RCL) is applied to input B. The output of adder 321 is the sum of A and B or the upper window limit UWL. Another functional unit 322 applies the same reference value to input A and the same absolute value of f(RCL) to input B. This unit subtracts input B from input A and outputs a lower window limit (LWL) value.

Deferring for the moment a discussion of the principles behind the FIG. 11 functionality, it may be noted that the UWL and LWL values are inputs to selector 320. The selector 320 choses its input A as its output if the sample on its input A falls outside of the window, that is, if the sample is greater than the UWL or less than the LWL. The selector 320 choses its input A as its output if the sample on its input A is within the window, that is, if the sample value is less than the UWL and greater than the lower LWL. Whatever the output of selector 320 is, it is applied to the B input of a divider 323. Input A of divider 23 receives the reference value. The divider 323 forms the ratio of A to B and this is the BRIGHTNESS (BRT) RATIO.

FIG. 12 is a plot that is useful for explaining the meaning of f(RCL). The two linear curves, one labeled CAPTURE VALUE and the other labeled LOCK VALUE, are respectively for creating a narrow window and, alternately, a wider window as needed. The abscissa represents the RAD CONTROL LAST range in an illustrative brightness control system. Values would be different in different systems, but for making the operation easier to understand some typical numerical values will be used in describing it. This is to be construed as illustrative and not as limiting the scope of the invention.

In FIG. 12 the minimum RAD CONTROL LAST VALUE and, hence, the shortest pulse-width obtainable with the system is at the intersection 331 of the ordinate and abscissa axes. For example, the minimum RCL value may correspond to 25 microseconds. Any RCL shorter than a critical value at point 333 along the abscissa is likely to require stabilizing. Assume the critical RCL corresponds to a pulse-width of 300 microseconds in this example. The objective is to stabilize the system by not changing the actual RAD CONTROL nor the pulse-width when pulse-widths fall below the critical width and are in the range necessary to produce a brightness sample within the window computed around the reference. Above the critical pulse-width and RCL, up to a maximum available 10 ms pulse-width in this example, little stabilizing action has to be taken so the system will adjust from image frame-to-image frame to maintain a ratio of the brightness sample to the reference of substantially 1 (one), that is, a BRT RATIO of 1. The focus now is on preventing oscillations and holding constant brightness when pulse-widths are below the critical value, but the system can be set up so the BRT RATIO does not have to arrive at exactly 1 as is accomplished by other mechanisms.

During the exposure or image frame at which the RCL value and pulse-width drops below the critical value 332, the curve 333 labeled "CAPTURE VALUE" is used to provide the f(RCL) and the window limits. The other curve, 334 is labeled LOCK VALUE. Note that for any pulse-width or RCL below critical value, the LOCK VALUE will yield a larger f(RCL) and, hence, larger window limits and a larger window than the CAPTURE VALUE for the same pulse-width and RCL. The f(RCL) for the CAPTURE VALUE is used to define the window limits for the first image frame in a sequence below critical value and for any successive image frames in which the brightness sample is found to be outside of the window around the reference. Once the sample is found to be inside the window the f(RCL) for the LOCK VALUE is used to define the window limits. The f(RCL) for the LOCK VALUE is continued to be used until such time as the brightness sample is found to be outside of this larger widow. At this point the UWL and LWL are again calculated from the f(RCL) CAPTURE VALUE. The alternate small and large windows which have the REFERENCE value between their upper window limit (UWL) and lower window limit (LWL) is dependent on where the brightness sample is in relation to the window. For example, in the illustrated embodiment of the invention the REFERENCE may have a stable value of 2.00. For example, if the f(RCL) happened to be 0.05 for a particular pulse-width, the LWL and UWL for the CAPTURE WINDOW would be 1.95 and 2.05, respectively. Since the LOCK VALUES are about 50% higher the LWL and UWL for the LOCK VALUE might be about 1.925 and 2.075, thus creating the larger window. As soon as the brightness sample falls within the CAPTURE WINDOW, the assumption is made that the sample is so close to the reference that their ratio, the BRT RATIO, is so close to 1 it can be treated as 1. In such case the selector 320 in FIG. 11 would output its B input, namely, the REFERENCE value, and with the REFERENCE applied to the A and B inputs of divider 323, its output BRT RATIO would equal 1. Now, if there is no scanning of the x-ray source or no significant change in x-ray attenuation by the image field so as to raise the pulse-width and RCL above the critical value, the sample will stay within the windows and the BRT RATIO will hold at 1 and brightness will stay constant even though brightness might be slightly different than the reference. The windows constitute dead bands. Once the sample is found inside of the smaller window determined from the f(RCL) CAPTURE VALUE, the wider window found from f(RCL) LOCK VALUE is used to evaluate the next sample.

It should be noted that the f(RCL) is a variable that increases as RCL decreases and decreases as RCL increases. The narrower the pulse-width, the bigger the window and vice versa because the necessary stabilizing is inversely proportional to the pulse-width for reasons stated previously.

When the first exposure at below critical RCL and pulse-width occurs, the sample is evaluated to determine if it falls in or out of the window corresponding to the pulse-width. On every single exposure the brightness sample is evaluated to determine if it falls inside or outside of the current window be it the LOCK VALUE or the CAPTURE VALUE. Once the sample falls within the CAPTURE WINDOW, then the object is to keep it in the window so the LOCK WINDOW is made larger. The effect of this is that the pulse-width has to increase substantially due to RAD CONTROL increasing as a result of increased x-ray attenuation before it is proper to let the BRT vary. It is desirable for the brightness to stay constant even at small pulse-widths which tend to produce unstable system response. This is accomplished by making the window larger as pulse-width or RAD CONTROL decreases. Additionally, by making the LOCK VALUE about 50% larger than f(RCL) for the CAPTURE VALUE at the current RCL, it is harder for the sample to get out of the window than to get into the window and there is hysteresis which promotes stability. It takes more of a change in x-ray attenuation to fall outside of the window.

The manner in which the CAPTURE and LOCK VALUE curves are determined will be elaborated. First of all the critical RCL or pulse-width is determined by experimenting with the particular brightness control system. In the illustrative example, a RCL corresponding to a pulse-width of about 300 microseconds was discovered to be the one point where the approach to system rise time is beginning.

A phantom comprised of low x-ray attenuating plastic is placed in the beam. The loop was run with minimum usable pulse-widths which might be 25 microseconds, for example, in a typical pulsed system. The phantom attenuation was so negligible that the desired brightness was achievable close to 25 microsecond RAD CONTROL. The CAPTURE VALUE maximum point or end point of this curve was chosen to be large enough so that the number of counts on the sample digitizing ADC 43 in FIG. 2 allowed successfully jumping into the CAPTURE window without jumping over it even though system rise time instabilities are prevalent. The equivalent of 13 counts on the 128 count resolution ADC 43 in this illustrative example turned out to be a large enough window for the shortest pulse-width possible. This is another point on f(RCL) curve. This point is connected by a straight line to the critical value. Then there is f(RCL) for every pulse-width below critical readable from the CAPTURE VALUE curve. These values can be accessed in synchronism with the current RAD CONTROL LAST. The functions can be stored in a look-up table such as the one represented by the block 324 in FIG. 11. The value of current RAD CONTROL LAST is the address to the corresponding f(RCL) and this function is supplied to the adders 321 and 322 by line 325. The LOCK VALUES are simply 1.5 times or some other multiple of the CAPTURE function values. They are also in storage 324. The table storage is enabled at the exposure or pulse rate and sync signals are input to storage 324 so CAPTURE and LOCK functions of RCL can be provided in synchronism with the image frames. The function data could also be calculated by a processor using the equations of the two lines 333 and 334 in FIG. 12 and matching with the values of RCL.

The dead band function symbolized by blocks 91 and 92 will now be discussed. Its purpose is to prevent making kV changes unless the calculated required brightness change is 5% or more in this particular embodiment. This prevents hunting and avoids loop instability. In the actual embodiment, if the kV change is greater than the dead band, the NEW BRT FACTOR is sent to converter 93. If the kV change is less than the dead band, the BRT FACTOR at (t−1) is sent out again.

As mentioned earlier, the power supply 23 for the x-ray tube is likely to employ an autotransformer which supplies the primary windings of the high kilovoltage step up transformer whose output voltage is rectified and applied to the anode of the x-ray tube for the duration of an x-ray exposure. An inherent characteristic of high kilovoltage generators based on autotransformers and those based on high frequency switching of current through large inductors too is quantization of their high voltage output to a fixed set of values. Generators using a variable autotransformer servo system such as the Volt-Pac of General Electric Company typically may have 30 to 120 taps and a corresponding number of output kilovoltage steps may result. Even so, it is unlikely that the kV CONTROL signal that is determined by the kV loop in FIG. 2 will coincide exactly with a kV step that is producible by the power supply transformer.

An ABC system which processes image brightness samples as does the system in FIG. 2, may attempt to settle at a particular kV value. If this value is not deliverable by the x-ray high voltage generator, then a brightness error will exist. The brightness control may oscillate by hunting for the correct kV command value to provide constant image brightness. Because of quantization of kV steps, proper brightness might never be achieved because the brightness output will oscillate from slightly high to slightly low. The amplitude of the brightness oscillations depends on the overall ABC and x-ray system loop gain response. The undesirable consequence of the oscillations is that there is a discernable flicker when images are viewed in rapid sequence.

Figure 7:
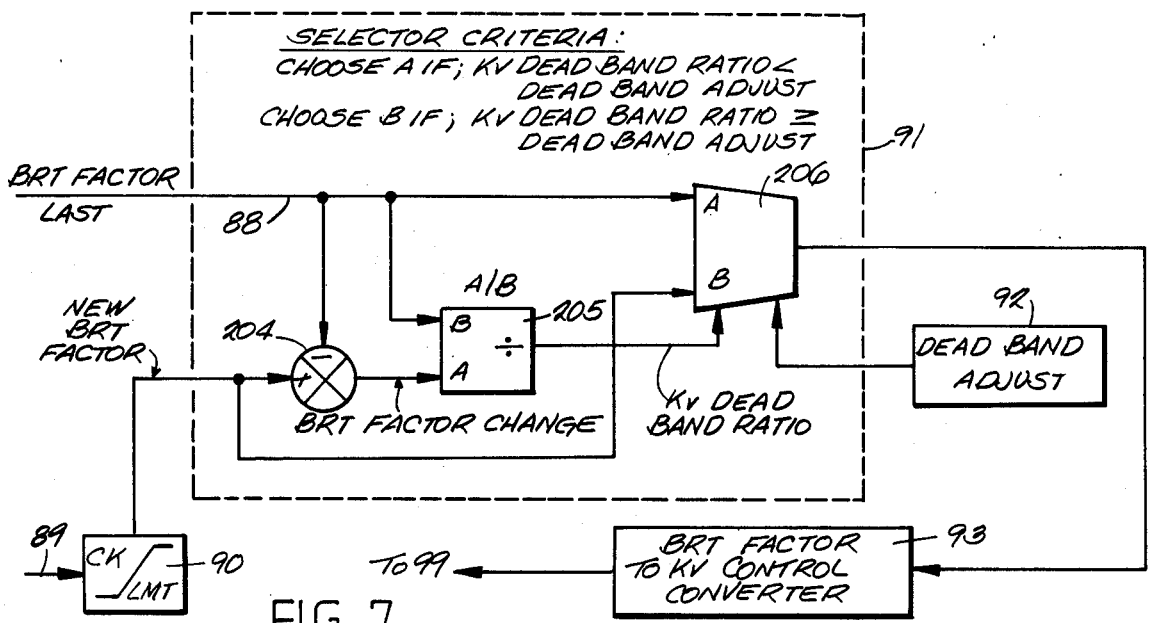
FIG. 7 is a modification for obtaining a dead band in the kV control to eliminate the effects of quantization in the kV supply.

The solution to the foregoing problems is to implement the dead band function represented by the block 91 in FIG. 2 with the circuit shown in FIG. 7. This circuit makes it necessary that there be a minimum percentage brightness error or a minimum percentage error between DIAL RAD CONTROL and BRT FACTOR LAST before the automatic brightness control will command a kV change from the x-ray power supply 23.

In FIG. 7 the difference or change between BRT FACTOR LAST and NEW BRT FACTOR is obtained using a subtracter 204. In a divider 205, the BRT FACTOR CHANGE fed to input A is divided by BRT FACTOR LAST on input B to form the kV DEAD BAND RATIO (kV DB RATIO). In a selector 206, the BRT FACTOR LAST enters input A, and NEW BRT FACTOR enters input B. The kV DEAD BAND RATIO along with a DEAD BAND ADJUST value, from block of FIG. 2, to select input A or input B of selector 206. Input A is chosen as the output of 206 if the kV DEAD BAND RATIO is less than the DEAD BAND ADJUST value. Input B is chosen as the output of 206 if the kV DEAD BAND RATIO is greater than or equal to the DEAD BAND ADJUST value. The output of selector 206 is used as the input to the BRT FACTOR to kV CONTROL CONVERTER, 93, shown as the following circuit device in FIG. 2. Thus, large changes in newly calculated BRT FACTORS are allowed to cause kV changes but small changes tend to be filtered out so hunting is prevented.

When the automatic brightness control, ABC, uses the BRT FACTOR LAST for successive calculations, the value of the kV command from converter 93 will not have changed from its original value. The ABC will settle the kV control command with a small brightness error which is compensated by other control functions of the loops.

Figure 8:
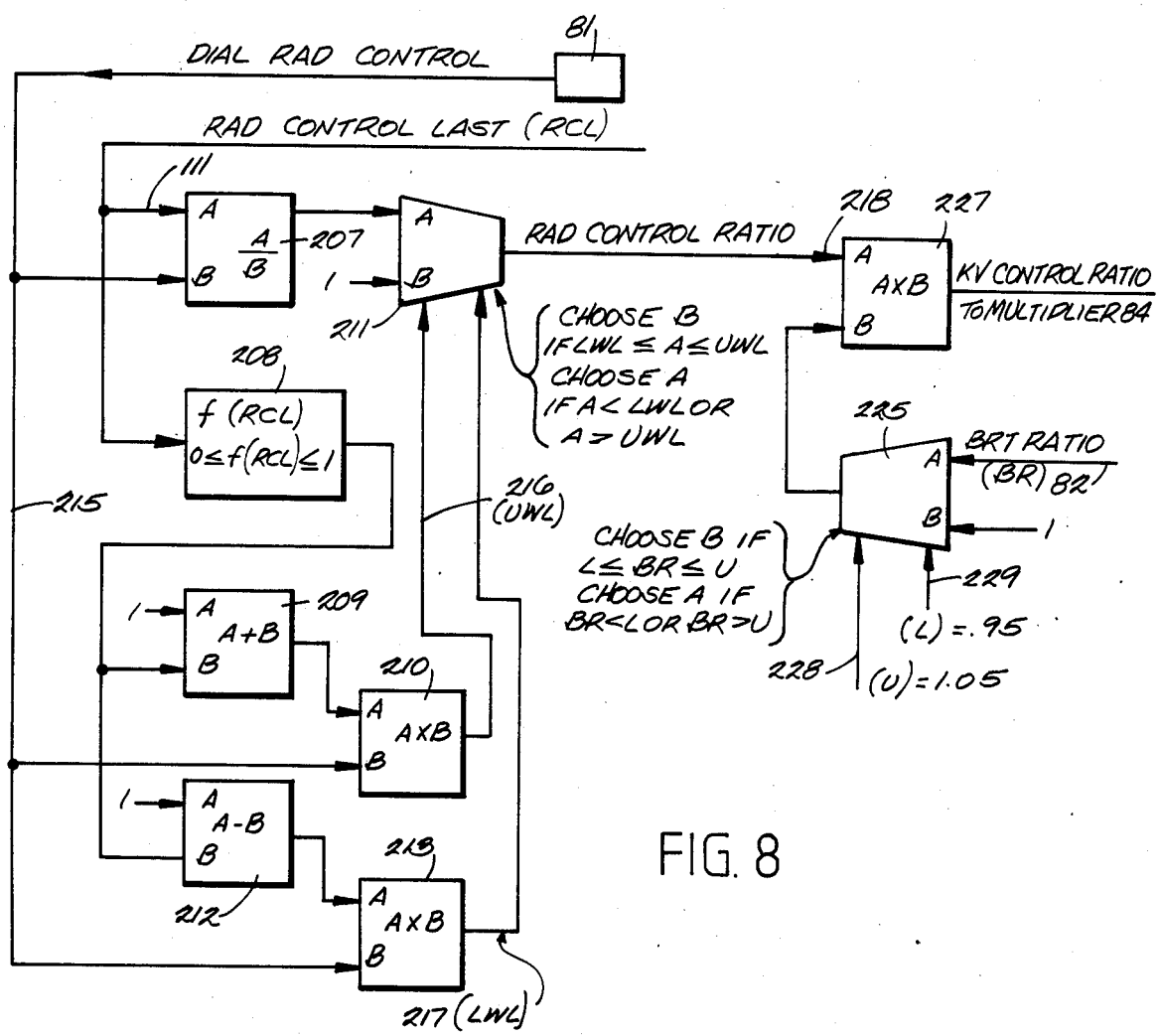
FIG. 8 is another modification for eliminating quantization in the kV supply.

Another arrangement for effectively limiting oscillatory system response due to kV source quantization is shown in FIG. 8. The left portion of the FIG. 8 circuit is a replacement for the divider 80 in FIG. 2 and the right portion is a replacement for multiplier 83. In the previously discussed solution a single dead band was implemented around the kV CONTROL RATIO after the two ratios of RAD CONTROL LAST to DIAL RAD CONTROL (RAD CONTROL RATIO) and the ratio of reference to sample or RATIO were multiplied together in multiplier 83 of FIG. 2. In the FIG. 8 arrangement, there are two different dead bands or two windows, one of which embraces the BRIGHTNESS RATIO and the other of which embraces the DIAL RAD CONTROL to RAD CONTROL LAST RATIO.

The first window is one that is computed around the desired or DIAL RAD CONTROL value. Computing the window involves looking at the value of the RAD CONTROL LAST (RCL) signal which is accessed on line 111 and is fed to the A input of a divider 207. A function of RCL f(RCL) is provided as represented by block 208. The function is a constant whose value is less than 1 but greater than 0 that governs the size of the window. In other words, it sets the upper and lower limits of the window. Block 208 can be a look-up table or calculation that produces a constant which depends on the value of RCL. The function is actually a dead band which specifies a certain perentage of when the window will be effective on RAD CONTROL. Then, using the f(RCL) one value higher than DIAL RAD CONTROL or the UWL is computed and one value lower than DIAL RAD CONTROL or LWL is computed to form the window limits. The value of f(RCL) is added to the value 1 (one) in a functional block 209 and subtracted from 1 (one) in a functional block 212. The result of the addition in block 209 is supplied to the A input of a functional block 210 for multiplication and the result of subtraction in block 212 is supplied to the A input of function block 213 for multiplication. The B inputs of multiplier blocks 210 and 2II are supplied with the DIAL RAD CONTROL value as indicated by line 215. Thus, the upper window limit (UWL) is output on line 216 and the lower window limit (LWL) is output on line 217. The UWL and LWL values are inputs to a selector functional block 211.

The A input to selector block 211 is the ratio of RCL to DIAL RAD CONTROL that is output from the divider function 207 and this is called the RAD CONTROL RATIO. The B input to selector functional block 211 is a value of 1 (one). If the last mentioned ratio is between UWL and LWL, then the value of B or 1 is selected, that is, a value of one is selected for the RAD CONTROL RATIO, thereby eliminating any impetus for kV changes from the RAD CONTROL RATIO. When the RAD CONTROL RATIO is 1 (one), there is no need for kV to change due to any small difference between RAD CONTROL and DIAL RAD CONTROL. When the value of the output ratio of RCL to DIAL RAD CONTROL from the divider block 207 is outside of the window it means that a more than minimum available kV change or step is called for and the selector 211 selects input A which is essentially the true new RAD CONTROL RATIO. In summary, as indicated adjacent selector block 211, B is selected if LWL is equal to or less than A and A is equal to or less than UWL. A is selected if A is less than LWL or A is greater than UWL.

In FIG. 2 the RAD CONTROL RATIO (RCR) and the BRIGHTNESS RATIO (BRT) are multiplied in functional block 83 to yield the kV CONTROL RATIO. In FIG. 8, the selector functional block 225 and multiplication functional block 227 supplant block 83 in FIG. 2. Functional block 225 is used to form a window around the BRIGHTNESS RATIO (BR). The limits for this window are shown as adjustable parameters (U) and (L). The number greater than BR represents the upper window limit, U, on line 228 and the number smaller than BR represents the lower window limit, L, on line 229. If the BRT RATIO (BR) is between U and L, then input B, that is, 1 is selected as the output from selector 225. The values of the upper and lower limits U and L to selector 225 could be made adjustable for more versatile adaptation to various systems. In this example they can be assumed to be constants since nothing is shown to vary them. By way of example and not limitation, typical values of U and L are 1.05 and 0.95, respectively. Hence, if there is a small error in brightness, the BRT RATIO will be between the upper and lower window limits and a value of 1 (one) will be output from selector 225 and fed to the B input of multiplication functional block 227 which computes the new kV CONTROL RATIO. Therefore, the impetus for small kV changes due to small brightness errors will be filtered out, in effect. As indicated next to selector 225, input B is selected if L (lower limit) is less than or equal to BRT RATIO (BR) and BR is less than U (upper limit) and input A, the true BR is selected if BR is less than L or greater than U. So, to summarize, large changes in BRT RATIO are allowed to be passed through selector 225 and small changes are mapped to a value of 1 (one) and have no effect in functional multiplier 227 on the kV CONTROL RATIO. The kV CONTROL RATIO OUTPUT from multiplier 227 is then supplied to multiplier 84 in FIG. 2 as was previously discussed in a case where no further explanation was given as to how changes commanded for kV that were smaller than the kV steps available from the kV supply are handled.

The description thus far reveals how, in accordance with the invention, a single condition is detected, namely, image brightness and how control of the x-ray tube current and kV are both governed by the single point condition. It has been shown that the x-ray tube mA is controlled basically in response to the ratio (RAD CONTROL) of a reference brightness signal to the detected brightness signal. It has also been shown how the RAD CONTROL COMMAND during one preceding brightness sampling period is compared to a set or selected RAD CONTROL value to provide an error which governs x-ray tube kV and alters kV depending on the size of the brightness ratio so that a kV control loop has information as to where the x-ray tube mA or RAD CONTROL should be.

The next matter to be discussed is how extending the concept of repeated ratioing can be used to control video gain. The concept can be extended to additional control loops, all based on using a single image brightness measurement. It has been shown that kV control depends on RAD CONTROL and now it will be shown how, in accordance with the invention, control of video camera gain is made interdependent width tube mA (pulse with) and kV.

It is an objective to increase video gain on a third or last priority basis after there is a prediction as to what part of the full range of the tube mA and kV range are used up. However, in accordance with the invention, if the sensed brightness error is very large, the need for video gain increase is predicted and gain is changed to some degree immediately. Video gain is directly proportional to image brightness.

The first stage in the video gain control loop in FIG. 2 is a divider 110. RAD CONTROL at (t−1) is supplied by way of lines 111 from latch 71 to the A input of divider 110. A reference signal generated in block 112 called MAX RAD CONTROL LIMIT is applied by way of lines 113 to the B input of divider 110. The second stage is a divider 114. The BRT FACTOR at t−1 from the kV CONTROL loop latch 85 is applied by way of lines 115 to the A input of divider 114. A maximum brightness factor reference signal generated in the block 116 which is labeled MAX BRT FACTOR LIMIT is applied to input B of divider 114. It should be understood that BRT FACTOR at (t−1) in the kV loop has resulted from using the LUT in converter 87 to convert kV in terms of brightness. The look-up table has a maximum limit which is in block 116. The RAD CONTROL signal also has a limit because available mA range is limited. The kV according to FIG. 3 is limited in this example to 120 kV. The tube mA range for fluoroscopy may be up to a 10 mA limit by way of example and not limitation.

The outputs from dividers 110 and 114 are inputs to a multiplier 117. The third input to multiplier 117 is the BRT RATIO or ratio of a reference brightness signal A to a sample brightness signal B that was used in the RAD CONTROL primary control loop and in the kV loop. The BRT RATIO is supplied to the third input by way of line 82.

A numerical example will elucidate what happens in the video gain control loop. Assume that the mA limit is 10 mA and the RAD CONTROL command corresponds to a desired 5 mA. The output ratio of divider 110 would be 5/10 or $\frac{1}{2}$. Assume the BRT FACTOR needed is a ratio resulting in 4 which, according to FIG. 3, would require about 80.35 kV. This is 4/7th of the brightness range available over the kV range of 60 to 120 kV. Now assume that at (t−1) the x-ray attenuation was high, tending to yield a dark image. Now assume that the brightness reference voltage A is 2 and the brightness sample voltage B reads 0.2 in which case A/B equals 2/0.2 or 10. These three ratios or fractions are multiplied in multiplier 117 to yield a VG RATIO appearing on digital lines 118. In general terms video gain ratio is determined as follows:

$$\frac{BRT \text{ FACTOR at } (t-1)}{\text{MAX } BRT \text{ FACTOR LIMIT}} \times$$

-continued
$$\frac{\text{RAD CONTROL at } (t-1)}{\text{MAX RAD CONTROL LIMIT}} \times$$

$$\text{REF VOLTAGE} = VG \text{ RATIO}$$
$$\overline{\text{BRT SAMPLE VOLTAGE}}$$

For the above numerical example:

$$\frac{4}{7} \times \frac{5 \text{ mA}}{10 \text{ mA}} \times \frac{2 \text{ volts ref.}}{0.2} = 2.85 = VG \text{ RATIO}$$

The result in this example is greater than 1 so video gain will increase. If the ratio came out to be 1 it would result from there still being a lot of mA and kV range remaining so there would be no video gain increase needed. It should be evident that video gain would tend to be increased if the ratios or first two terms in the above equations are large and approaching 1 indicating that mA and kV are already near their limits.

After the VG RATIO is determined the ratio signal is processed in the video gain loop similarly to processing in the RAD CONTROL loop. In the VG loop, the VG RATIO and VIDEO GAIN CONTROL at (t−1) are multiplied in a multiplier 119 to yield the NEW VG CONTROL command. There are limits on the rate at which video gain can be changed and there are limits on the range of gain. So the loop requires damping and slew limiting indicated by the blocks 120 and 121. The damping adjust and slew limit adjust are simply fractional factors which multiply times calculated video gain to limit the amount of change permitted in a sampling period. The gain limits are checked first as symbolized by the block 122 and then the NEW VG CONTROL and VG CONTROL at (t−1) are compared in subtractor 123 and the result, namely, the delta change is sent to the zero integrator function block 124. In block 124 the slew limit is used to keep the predicted gain change within limits that the video camera electronics can respond to at the given frame rate. The damping fraction is applied to the delta change to minimize overshoot and to meet proper settling times. The processed VG CONTROL signal output from the zero error integrator function is stored in latch 125 for one sample period and the VG CONTROL signal is also sent out on digital lines 126.

It may be noted again that in the actual embodiment, values involved in the calculations are in digital form and that the math functions are carried out with integer math techniques for the sake of speed in the kV and VG CONTROL loops as was previously discussed in connection with the RAD CONTROL loop.

Figure 4:
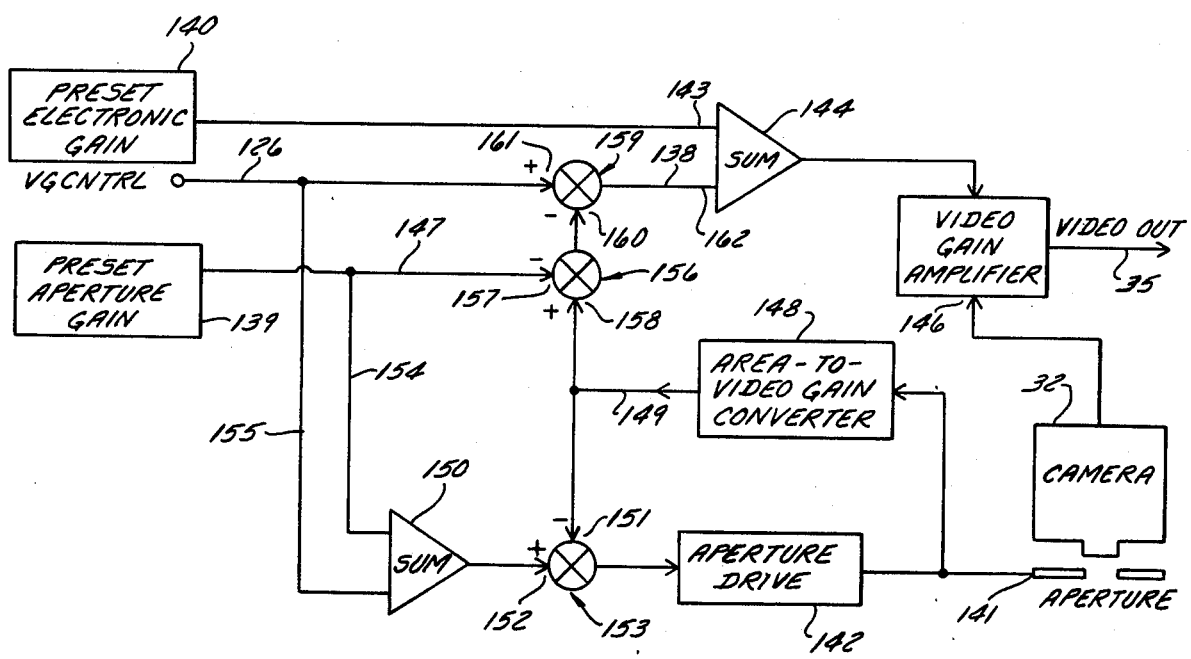
FIG. 4 is a diagram of the electronic components involved in varying the gain of the video camera in the system as a third priority function for controlling image brightness.

The video gain command, VG CONTROL, is output on line 126 in FIG. 2 and appears on a line 126 in FIG. 4. FIG. 4 shows the camera control system which is in the housing for the video camera 32. There are two ways of controlling the gain or brightness output of the video camera. One is to control the aperture size. The aperture blades are marked 141. The other is to control electronic gain. The servo system or aperture drive is represented by the block marked 142 which will be understood to contain electronic servo drive circuitry and a servo motor, neither of which are shown, that adjust the opening between blades 141 and, hence, the amount of light going to the target of the video camera.

Although the video gain control loop in FIG. 2 only produced one VG CONTROL command signal, this signal is used to drive the camera control so as to give priority to adjusting the aperture size and then electronic gain in FIG. 4. Increasing electronic gain is restrained because it will increase noise as well as brightness.

FIG. 4 shows a functional block diagram implementation of the basic circuit used to receive the VG CONTROL command from FIG. 2 and to derive an aperture drive command and an electronic video gain command.

A preset electronic gain reference signal is generated in the block 140 which is labeled PRESET ELECTRONIC GAIN. This signal is applied to one input 143 of a summing amplifier 144. The output of amplifier 144 is a control signal for changing the electronic gain of a video gain amplifier 145 which has an input 146 for analog video signals generated in video camera 32. The output of the video gain amplifier provides the video input for television monitor 36 in FIG. 1 by way of line 35. A preset aperture gain reference signal generated in the block 139 which is labeled PRESET APERTURE GAIN. This signal is applied to one input of the summing amplifier 150 by way of line 154. The output of amplifier 150 is a control signal for changing the aperture position. This signal enters input 152 and is compared in subtractor 153 with the result, namely, the aperture position error command. A block marked 148 and identified as an area-to-video gain converter is in a feedback loop which senses aperture size and produces a corresponding output signal on line 149.

The VG CONTROL command from FIG. 2 enters the video gain control circuit by way of line 126. The video gain control signal is applied to input 161 and compared in subtractor 159 with input 160. The resulting difference signal or electronic gain command is summed with the PRESET ELECTRONIC GAIN at input 143 of summing amplifier 144. The VG CONTROL command from FIG. 2 entering by way of line 126 is tapped and transmitted by way of line 155 to one input of the summing amplifier 150. The preset aperture gain reference signal generated in block 139 is applied to input 157 of subtractor 156 by way of line 147. Input 157 is subtracted from present aperture gain signal 158. The difference signal representing the total area covered by the aperture becomes one input 160 to the subtractor 159.

There are, of course, various scale factors that must occur and are not shown but are used, for example, to insure similar signal units operating on similar signal units. All conversion factors and scale factors are assumed to be contained in the named block functions.

Figure 5:
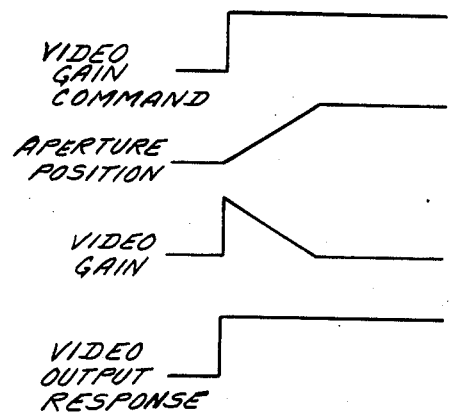
FIG. 5 is a group of related timing diagrams for showing how the video electronic gain circuit and the electronics controlling the aperture of the video camera respond to a gain change command.

FIG. 5 shows the operation of the control circuit of FIG. 4 with four signal timing diagrams The first signal represents the VG CONTROL input from line 126. This is the video gain or brightness change required of the camera as predicted by the automatic brightness control predictor function VG CONTROL command signal from FIG. 1. The second signal represents the movement of the aperture 141 in FIG. 4. The third signal represents the changing electronic video gain signal output of summing amplifier 144 in FIG. 4. The fourth timing signal represents the resulting video output on line 35 of FIG. 4.

The aperture position is allowed to change continuously provided there exists a video gain command and the aperture position is not yet at its limit. The electronic video gain is also allowed to make a full correction. The electronic gain assumes the primary loop control function as did the RAD CONTROL loop in the predictor function shown in FIG. 2. The electronic gain responds fast, but amplifies the noise as well as the signal and is therefor not desirable unless absolutely necessary to maintain correct brightness of the displayed image. The aperture position is sampled on a frame-by-frame basis and the aperture positions corresponding to brightness change and video gain change is subtracted from the electronic gain. The video gain control system will settle as a gain equal to the video gain command with as little electronic gain as needed. When the system finally settles out the electronic gain is equal to the remaining gain needed to satisfy the VG CONTROL command after the aperture position contribution to gain is at its limit.

The taper function, symbolized by the block 53 is a transfer function which is needed to convert input commands expressed in one kind of units to output commands of another kind of units. The taper function circuitry and associated circuitry for accounting for changes in the distance between the x-ray tube focal spot (S) and the image plane (spot-to-image distance, SID) is described in detail and shown in FIG. 2 of U.S. patent application Ser. No. 569,179, filed Jan. 9, 1984, now U.S. Pat. No. 4,590,603 which is incorporated herein by reference.

The transfer function of x-ray tube filament heating current and the mA flowing through the tube is an exponential function. Brightness is directly proportional to mA. Filament current is varied to obtain image brightness changes only when the system is operating in the continuous fluoroscopic or non-pulsed mode. The opposite of an exponential is a logarithmic curve. So in the system being described, the filament current command or RAD CONTROL command is converted to its logarithmic equivalent in a look-up table, not shown, in block 51 of FIG. 1. In the taper function as kV is raised, mA is lowered to keep 10R/min at the patient entrance plane. The taper function circuit 53 has two inputs, one of which is the filament current command and the other the kV command as is the case in FIG. 2 of the reference patent and the output drives the filament current controller 21.

In continuous non-pulsed, fluoroscopic modes of operation brightness is controlled by changing the filament current with filament current controller 21 in FIG. 1. Thermionic emission of electrons increases as filament heating current increases. Changing electron emission at any anode kV results in a change of electron current in terms of milliamperes (mA) flowing through the x-ray tube and this current is directly proportional to image brightness. The mathematical relationship between the filament heating current and electron emission can be approximated with the well known function:

$$I(th) = K1\, e^{K2\, I(f)}.$$

where:

$I(th)$ = x-ray tube thermionic emission current
$I(f)$ = filament heating current.
k1, k2 = constants.

The new ABC predictive controller described herein corrects for brightness error using a ratioing method that models emission current and not filament current. This is accomplished by implementing the log conversion block 51 of FIG. 1 as is done in FIG. 10.

In order to control brightness using the filament current command signal (FIL CMND) on line 22 in FIG. 1, the proportional RAD CONTROL signal must be converted to a corresponding logarithmic value or compressed to yield a linear relationship between calculated RAD CONTROL signal and x-ray tube emission current. The implementation of the FIG. 10 circuit of such a log function has executed filament current commands (FIL CMND) with a dynamic range of 200:1 and a resolution of 2-3%. A look-up table, not shown, or an array of precalculated log values could be used. The problem with a straight look-up table method when using a 200:1 dynamic range signal with 2% resolution is that a vast quantity of memory locations are required. The FIG. 10 log converter avoids this problem and optimizes the speed of the calculation while preserving the large dynamic range and resolution.

Figure 10:
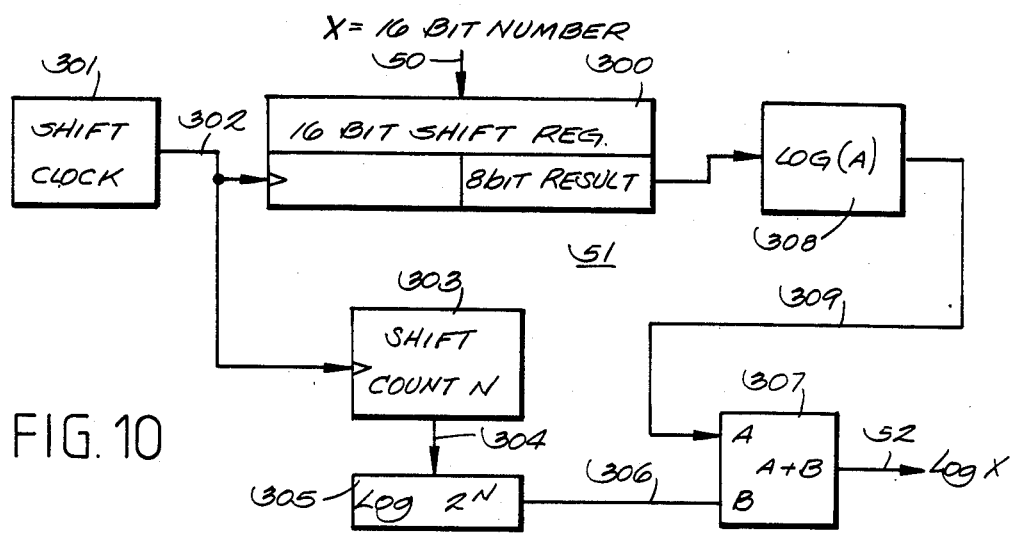
FIG. 10 is a functionality for converting tube current commands to logarithm values to obviate the nonlinear relation between x-ray tube filament heating current and electron emission current.

In FIG. 10 a 16-bit number (x) representing filament current command (FIL CMND) on line 50 in FIG. 1 is input to a shift register 300. A shift timing clock 301 supplies the shift impulses to register 300 by way of line 302. A FIL CMND signal is digital divided by 2 by right shifting a 16-bit value until the resulting value is an 8-bit value. The least significant bits are lost but the number of shifts is remembered in a shift counter 303. Using the principle that log (A*B)=log (A)+log (B), a memory space 305 can be defined to contain the logs of the powers of 2 and to be addressed by way of addressed lines 304 by the number of shifts required to achieve an 8-bit number in this example. Only 9 or 10 bytes of memory may be required. If there are 8 shifts, N in memory 305 will equal 8 and the output of log $2^8$ ($256_{10}$) on multiple lines 306 would be a binary number equivalent to decimal number 2.40823996 which is log B. This is supplied to the B input of an adder 307. The 8-bit digital number output from shift register 300 is input (A) to a processor which calculates the log of the 8-bit number A. The result is supplied by way of multiple lines 309 to the A input of adder 307 which adds the log of A to the log of B to yield the log of the 16-bit number, X, which is input to the shift register 300. The result, log X, is output on line 52 to the taper function 53 as shown in FIG. 1.

By way of example and not limitation let the 16-bit number X be binary 1111110110110010 which is equivalent to decimal 64946. Eight shifts results in only the eight most significant bits remaining and this result is 11111101 or decimal 253. The log of 253=log A=2.403120521 decimal. The log of $2^8$=log B=log 256=2.40823996. Log A+log B=4.811360512 decimal. The antilog of the summation is approximately 64946 so the log of the original 16-bit number X is obtained with use of little memory space and a few other integrated circuits. The example takes the logs to the base 10 but the result would be the same if natural logarithms were used.

The calculations performed in the various loops are collected and set forth below for the convenience of the reader. The acronyms whose corresponding terminology is not specifically defined hereafter are as follows:

| ACRONYM = | TERM |
|---|---|
| BRT RATIO = | BRIGHTNESS RATIO |
| BRT REF = | BRIGHTNESS RATIO |
| BRT SAMP = | BRIGHTNESS SAMPLE |
| RAD CONTROL = | RAD CONTROL |
| LUT = | LOOK UP TABLE |
| MIN kV = | MINIMUM KILOVOLTS |
| SET LMT = | SET LIMIT |
| VG CNTRL (VGC) = | VIDEO GAIN CONTROL |
| VGR = | VIDEO GAIN RATIO |

-continued

RAD CNTRL LOOP
STEP 1 - Determining brightness ratio from
the sample. The results indicate a brightness error
factor. 1 = no error, > 1 = low brightness, and > 1 =
high brightness.
BRT RATIO = BRT REF/BRT SAMP
where: BRT REF = desired brightness level (calibration
point)
and
BRT SAMP = sampled brightness signal.
Note: This sample shall have a minimum limit so that
it cannot go to "0". The limit should be set at a
point where the BRT SAMP error starts to become
significant.
STEP 2 - Calculate the NEW RAD CNTRL value
required to correct the brightness error represented by
the BRT RATIO.
NEW RAD CNTRL = RAD CNTRL LAST × BRT RATIO
min lmt <= NEW RAD CNTRL <= max lmt
where: min lmt = lowest RAD CNTRL allowed
and
max lmt = highest RAD CNTRL allowed kV CNTRL LOOP
STEP 3 - Determine need for kV override.
This procedure determines if kV override is
needed. That determination is based on kV keeping the
RAD CNTRL at its SET LMT.
kV RATIO = REF/[[SET LMT/RAD CNTRL LAST] ×
BRT SAMP]
where: SET LMT = 95% maximum RAD CNTRL allowed or
DIAL LMT (Pulse Mode), whichever is less.
From look up TABLE (LUT) find BRT FACTOR for
PRESENT kV.
NEW BRT FACTOR = BRT FACTOR × kV RATIO
STEP 4 - Check deadband limits.
From LUT find NEW kV
where: MIN kV (dial) <= NEW kV <= MAX kV VG CNTRL LOOP
STEP 5 - Determine VIDEO GAIN CNTRL change.
VID GAIN RATIO - [BRT RATIO] × [RAD CNTRL/MAX
LMT] × [kV BRT FACTOR/MAX BRT FACTOR]
NEW VGC = VGC × VGR
where: 0 <= NEW VGC <= MAX LMT At this point the predictor function is complete. The following steps determine the step change in control parameters to be made for this sample period.

The step size is determined by applying the proper slew limit and damping factor to each control parameter. The slew limit is adjusted to keep the command signal from getting ahead of the controlled parameter when the control element is in slew limit. The damping factor sets the small signal response of the control. Both compensations change proportionately with sample (exposure) rate changes.

(RAD CNTRL) ZERO ERROR INTEGRATOR FUNCTION
STEP 6 - Determine RAD CNTRL change
RAD CNTRL CHANGE = (NEW RAD CNTRL-RAD CNTRL)
× RCDF
where: −MAX STEP <= RAD CNTRL CHANGE <= +
MAX STEP
AND
RCDF = Rad Cntrl Damping Factor (=<1)
AND
MAX STEP = SLEW LIMIT
THEN
RAD CNTRL = RAD CNTRL + RAD CNTRL CHANGE
(kV CNTRL) ZERO ERROR INTEGRATOR FUNCTION
STEP 7 - Determine kV CNTRL change
kV CNTRL CHANGE = (NEW kV CNTRL − kV CNTRL) ×
kV DF
where: −MAX STEP <= kV CNTRL CHANGE <= +MAX
STEP
and
kV DF = kV Damping Factor (=<1)

-continued

```
kV CNTRL = kV CNTRL + kV CNTRL CHANGE
   (VG CNTRL) ZERO ERROR INTEGRATOR FUNCTION
STEP 8 - Determine VGC change.
VGC CHANGE = (NEW VGC − VGC) × VGCDF
where: −MAX STEP< = VGC CHANGE < = +MAX STEP
and
VGCDF = VGC Damping Factor (= <1)
VGC = VGC + VGC CHANGE
Issue BRT INDEX = BRT RATIO × [BRT FACTOR/NEW
BRT FACTOR] × [RAD CNTRL/NEW RAD CNTRL]
FURTHER DEFINITION
```

The kV CNTRL and VGC can go directly to their appropriate controllers. The RAD CNTRL signal can go directly to the pulse width control in the pulse. To properly drive the taper function for mA control the input to the taper must take the form:

FIL TAPER COMND=LOG (RAD CONTROL signal)

The output of the taper function is then the filament drive command.

We claim:

1. In a fluoroscopic system comprised of an x-ray tube having an anode and a cathode, means for adjusting the average current (mA) flowing between the anode and cathode of the tube during an x-ray exposure sequence, means for controlling the kilovoltage applied to the anode of the tube, an image intensifier operative to convert an x-ray image produced by the x-ray beam from the tube to an optical image, a video camera for converting said optical image to analog video signals; means for adjusting the gain of said video camera, a video monitor for translating said video signals to a visible image, and a device for controlling image brightness, said device comprising:

means for sampling the brightness of the image during successive periods and for producing a signal (B) representative of brightness during the current sampling period, means for producing a constant reference signal (A), a primary control loop including means for taking the ratio of signal A to signal B (BRIGHTNESS RATIO) such that a RATIO other than 1 indicates an error between the present brightness signal and the reference brightness signal, said primary loop including means for storing a command signal (RAD CONTROL LAST signal) corresponding to the level to which the x-ray tube mA was commanded to be at during the brightness sampling period preceding the current brightness sampling period, and means for multiplying the BRIGHTNESS RATIO signal of the current sampling period by the RAD CONTROL LAST signal to produce a NEW RAD CONTROL SIGNAL corresponding to a command signal to which said mA adjusting means responds to cause said BRIGHTNESS RATIO to substantially equal 1, means for subtracting said NEW RAD CONTROL signal from said RAD-CONTROL LAST signal to produce a difference signal corresponding to the signal for commanding said means for adjusting average mA to change, a loop (kV loop) for determining the proportion of the brightness error that needs to be corrected by adjusting the kilovoltage (kV) applied to the x-ray tube anode, said kV loop including means for taking the ratio of said RAD CONTROL LAST signal (A) and a dialed RAD CONTROL signal (B) corresponding to the conduction interval desired for the x-ray tube during each sampling period and, hence, to the average x-ray tube mA, the signal resulting from taking the ratio of the RAD CONTROL LAST and dialed RAD CONTROL signals being designated the RAD CONTROL RATIO signal, said kV loop including means for multiplying said RAD CONTROL RATIO signal and said BRIGHTNESS RATIO SIGNAL for producing a kV CONTROL RATIO signal corresponding to how much kV adjustment is required to correct brightness if said primary loop predicted command signal equals a value different than the selected RAD CONTROL signal which corresponds to the brightness error that would result if RAD CONTROL signal were forced to be equal to the dialed SELECTED RAD CONTROL signal, means in said kV loop for storing a command signal (kV CONTROL LAST) corresponding to the level to which the x-ray tube kV was commanded to be at during the brightness sampling period preceding the current brightness sampling period, means for converting said kV CONTROL LAST signal to a BRIGHTNESS FACTOR LAST signal representing a normalized brightness of 1 corresponding to the minimum kV available and for converting a BRIGHTNESS FACTOR LAST signal to a kV CONTROL signal, means for multiplying said BRIGHTNESS FACTOR LAST signal after conversion and said kV CONTROL RATIO signal to produce a NEW BRIGHTNESS FACTOR signal and then converting said NEW BRIGHTNESS FACTOR signal to the NEW kV CONTROL signal, and means for subtracting said kV CONTROL LAST SIGNAL from said NEW kV CONTROL signal to produce a difference signal corresponding to the signal for commanding said means for controlling the x-ray tube anode voltage to change.

2. The device according to claim 1 including a VIDEO GAIN loop (VG loop) for determining the proportion of the brightness error that needs to be compensated by adjusting the gain of said video camera, said VG loop comprising means for generating a signal corresponding to the maximum limit of the RAD CONTROL signal (MAS RAD CONTROL LIMIT) and means for taking the ratio of the RAD CONTROL LAST signal (A) to the MAX RAD CONTROL LIMIT (B) signal to produce a first resulting signal, means for generating a signal corresponding to the MAXIMUM BRIGHTNESS FACTOR LIMIT, means for taking a ratio of the BRIGHTNESS FACTOR LAST (A) signal from said kV loop and said signal corresponding to the MAXIMUM BRIGHTNESS FACTOR LIMIT (B) to produce a second resulting signal, means for multiplying said first and second resulting signals and said BRIGHTNESS RATIO SIGNAL together to yield a video gain ratio (VG RATIO) signal representative of the predicted brightness error to be corrected for by changing the video camera gain if both the kV control signal and the RAD CONTROL signal were to reach their maximum limits, means for storing a video gain control last signal (VG CONTROL LAST signal) corresponding to the level which the video camera gain was commanded to be at during the last brightness sampling period preceding the current brightness sampling period, means for multiplying said VG RATIO signal and said VG CONTROL LAST signal to produce a NEW VG CONTROL signal, and means for subtracting said NEW VG CONTROL signal from said VG CONTROL LAST signal to produce a difference signal corresponding to the signal for commanding said means for adjusting the gain of said video camera to change.

3. In a fluoroscopic system comprised of an x-ray tube having an anode, a cathode and a control electrode, current regulator circuitry for controlling of the average current (mA) flowing between the anode and cathode of the tube during an x-ray exposure sequence, an x-ray image intensifier operative to convert an x-ray image produced by said tube to optical images, video camera means for converting said optical images to analog video signals, gain control means for said video camera, a video monitor for translating said visible signals to a visible image, kilovoltage regulating circuit means for controlling the kilovoltage (kV) applied to said anode of said x-ray tube, and means for controlling image brightness continuously, said image brightness control means comprising:

detector means operative to produce a brightness signal (B) representative of image brightness during a sampling period at time (t), means for producing a reference signal (A), corresponding to a desired brightness level, a primary control loop including divider means having an output and inputs for said brightness signal and reference signal and being operative to take the ratio A/B to yield on its output a brightness ratio (BRT) signal where a ratio of other than a predetermined value is indicative of an error between sampled and desired brightness at time (t), storage means having an output and an input for a radiation control last (RCL) signal for the preceding sample period which is a function of said BRT signal at time (t−1), namely, the time at which the image brightness was sampled next preceding the sample at time (t), multiplier means having an output and having input means coupled to said storage means output and to said output of said divider means and operative to multiply said RCL signal and the BRT signal obtained at time (t) to yield a new radiation control signal representative of brightness at time (t), means for subtracting said new radiation control signal from said RCL signal to produce an output signal corresponding to a radiation control signal for the sample at time (t), means for coupling said output of said subtraction means to said input of the storage means to effect storage of said radiation control signal until the next brightness sampling period, and means for supplying said radiation control signal to said mA regulator circuitry for said circuitry to respond by adjusting the average mA through said tube until said ratio of signals A to B attains said predetermined value indicative of no significant error between sampled and reference brightness at time (t).

4. The image brightness controller according to claim 3 including a loop (kV control loop) for determining the proportion of brightness error that needs to be corrected by adjusting the kilovoltage (kV) applied to said x-ray tube anode, said kV control loop comprising:

means for producing a selected radiation control (SRCS) signal corresponding to the pulse width or conduction interval desired for the x-ray tube during an exposure sequence, divider means in said kV control loop having an output and input means for said SRCS signal and for said RCL signal and operative to take the ratio of said RCL signal with respect to said SRCS signal to yield a radiation control ratio (RCR) signal on its output corresponding to the average x-ray tube mA desired during an exposure interval, first multiplier means having an output and having input means for input of said RCR and BRT RATIO, said first multiplier means being operative to multiply said RCR and BRT RATIO and yield on its output a kV control ratio (kVCR) signal representative of how much kV adjustment is required to correct image brightness if said new radiation control signal produced in said primary radiation control loop equals a value different than said selected radiation control (SCRS) signal which corresponds to the brightness error that would result if said new radiation control signal were forced to be equal to said SCRS signal, storage means in said kV loop having an output and an input and operative to store a kV regulator control (kV control last) at time (t−1) signal generated in said kV loop at sample period time (t−1), a kV control last signal-to-brightness factor converter having an output and having an input coupled to said kV loop storage means output, said converter converting said kV control last signal at time (t−1) representative of an applied kV to a brightness factor last signal at time (t−1) where brightness factors are defined as a range of values corresponding to image brightness as a function of kV applied to said x-ray tube anode, second multiplier means in said kV control loop having an output and input means, said input means coupled to said output of said converter and to said output of said first multiplier means for said second multiplier means to multiply said kV control ratio signal and said brightness factor last at (t−1) signal to yield a new brightness factor (new BRT factor) signal, a brightness factor-to-kV control signal converter having an output and having an input and means coupling said output of said second multiplier to said input of said converter, said converter yielding a new kV control signal at time (t), and means for coupling said new kV control signal to said kV regulating circuit for causing said circuit to adjust kV.

5. The image brightness controller according to claim 4 including a video gain loop (VG loop) for determining the proportion of the brightness error that needs to be compensated by adjusting the gain of said video camera means, said loop comprising:

means for generating a limit signal corresponding to the maximum permissible limit of said radiation control last (RCL) signal in said primary loop, divider means having an output and having inputs to which said radiation control last signal (RCL signal) at time (t−1) and said limit signal are coupled, said divider means being operative to provide a first resulting ratio signal on said output, means for generating a signal corresponding to the maximum permissible limit of said brightness factor, first divider means having an output and inputs to which said brightness factor last signal and said maximum permissible limit signal are coupled, said first divider means being operative to produce a second resulting ratio signal at said output, first multiplier means in said VG loop having an output and inputs to which said first and second resulting ratio signals and said BRT signals are coupled, said first VG loop multiplier means being operative to produce on its output a video gain ratio (VG ratio) signal, storage means in said VG loop for storing a video gain control (VG control) signal generated at time (t−1) sample period, said storage means having an output and having an input for receiving said VG control signal, second multiplier means in said VG loop having an output and inputs, one input coupled to said storage means output and another input coupled to said output of said first VG loop multiplier means, said second multiplier means operating to multiply said VG ratio signal and said VG control signal at time (t−1) to yield on said output a new VG control signal at time (t) sampling period, subtracting means having an input for said new VG control signal and an input for said VG signal at time (t−1), said subtracting means operating to produce a difference signal for commanding said gain control means to change the camera gain, means coupling said output of said VG subtracting means to said input of said storage means for storing said VG difference signal, gain control means included in said video camera means for controlling the gain of said video camera in response to the value of said VG difference signal, and means for coupling said VG difference signal to said gain control means.

6. The brightness controller according to claim 3 wherein said current regulator circitry includes:

a bias voltage source coupled to said control electrode of said x-ray tube for applying a negative bias voltage of said electrode, bias control means operative to switch said source on and off, a pulse timer connected to said bias control means for operating said control, said timer having an input for a pulse width command signal and being operative to produce a pulse timing signal whose duration varies in response to the magnitude of said pulse width command signal, said radiation control signal constituting said pulse width command signal and means for coupling said signal to said pulse timer.

7. The brightness controller according to claim 3 wherein said current regulator circuitry includes:

a filament current controller for controlling the current through the filament in said x-ray tube cathode and to correspondingly control the electron beam current through said tube in response to a command signal, means for converting a signal to its corresponding logarithmic value signal, said means having input means for said radiation control signal and having output means, a taper function circuit having input means receiving said logarithmic value signal and said kV control signal and having output means, said taper function circuit being operative to modify said kV control signal and said radiation control logarithmic signal to produce a first command signal on said output which is limited to a value that will preclude exceeding a predetermined radiation rate the body in the x-ray beam, and means coupling said first command signal to said filament current controller.

8. The brightness control system according to claim 1 including means operative to add an offset signal to said NEW RAD CONTROL signal to compensate for non-proportionality between radiation output from said x-ray tube and exposure time as exposure time approaches the system rise time.

9. In a fluoroscopic system comprised of an x-ray tube having an anode and a cathode, means for adjusting the average current (mA) flowing between the anode and cathode of the tube during an x-ray exposure sequence, means for controlling the kilovoltage applied to the anode of the tube, an image intensifier operative to convert an x-ray image produced by the x-ray beam from the tube to an optical image, a video camera for converting said optical image to analog video signals; means for adjusting the gain of said video camera, a video monitor for translating said video signals to a visible image, and a device for controlling image brightness, said device comprising:

means for sampling the brightness of the image during successive periods and for producing a signal (B) representative of brightness during the current sampling period, means for producing a constant reference signal (A), a primary control loop including means for taking the ratio of signal A to signal B (BRIGHTNESS RATIO) such that a RATIO other than 1 indicates an error between the present brightness signal and the reference brightness signal, said primary loop including means for storing a command signal (RAD CONTROL LAST signal) corresponding to the level to which the x-ray tube mA was commanded to be at during the brightness sampling period preceding the current brightness sampling period, and means for multiplying the BRIGHTNESS RATIO signal of the current sampling period by the RAD CONTROL LAST signal to produce a NEW RAD CONTROL SIGNAL corresponding to a command signal to which said mA adjusting means responds to cause said BRIGHTNESS RATIO to substantially equal 1, means for subtracting said NEW RAD CONTROL signal from said RAD CONTROL LAST signal to produce a difference signal corresponding to the signal for commanding said means for adjusting average mA to change, a loop (kV loop) for determining the proportion of the brightness error that needs to be corrected by adjusting the kilovoltage (kV) applied to the x-ray tube anode, said kV loop including means for taking the ratio of said RAD CONTROL LAST signal (A) and a dialed RAD CONTROL signal (B) corresponding to the conduction interval desired for the x-ray tube during each sampling period and, hence, to the average x-ray tube mA, the signal resulting from taking the ratio of the RAD CONTROL LAST and dialed RAD CONTROL signals being designated the RAD CONTROL RATIO signal, said kV loop including means for multiplying said RAD CONTROL RATIO signal and said BRIGHTNESS RATIO SIGNAL for producing a kV CONTROL RATIO signal corresponding to how much kV adjustment is required to correct brightness if said primary loop predicted command signal equals a value different than the selected RAD CONTROL signal which corresponds to the brightness error that would result if RAD CONTROL signal were forced to be equal to the dialed SELECTED RAD CONTROL signal, means in said kV loop for storing a command signal (kV CONTROL LAST) corresponding to the level to which the x-ray tube kV was commanded to be at during the brightness sampling period preceding the current brightness sampling period, means for converting said kV CONTROL LAST signal to a BRIGHTNESS FACTOR LAST signal representing a normalized brightness of 1 corresponding to the minimum kV available and for converting a BRIGHTNESS FACTOR LAST signal to a kV CONTROL signal, means for storing a kV CONTROL LAST DAMPING signal which was produced during the last brightness sample period before the current period, means for obtaining the difference between said kV CONTROL LAST DAMPING value and said NEW kV CONTROL value, said difference being designated the DELTA kV CONTROL CHANGE, integrator means including means for multiplying said DELTA kV CONTROL CHANGE value by a damping factor to produce a kV CONTROL CHANGE that is smaller than the computed DELTA kV CONTROL CHANGE to limit the rate of change, means for limiting said kV CONTROL CHANGE value to within the limits of the maximum obtainable rate of change of the kV, means for then combining said limited kV CONTROL CHANGE and said kV CONTROL LAST DAMPING value.

10. The brightness control system according to claim 1 with means for providing a dead band so that a minimum brightness error or a minimum percentage error between DIAL RAD CONTROL and BRIGHTNESS FACTOR LAST is required before the system will command a kV change, wherein, before said NEW BRIGHTNESS FACTOR value is converted to said NEW kV CONTROL value there are means for obtaining the difference between said NEW BRIGHTNESS FACTOR and said BRIGHTNESS FACTOR LAST, said difference being designated the BRIGHTNESS FACTOR CHANGE, means for dividing the BRIGHTNESS FACTOR change by the BRIGHTNESS FACTOR LAST value to yield a value designated as the kV DEAD BAND RATIO, limiter means with means to pass kV DEAD BAND RATIOS that are large enough to effectuate a full available kV step change and to block RATIOS that are too small to effectuate a full available kV change.

11. In a fluoroscopic system comprised of an x-ray tube having an anode and a cathode, means for adjusting the average current (mA) flowing between the anode and cathode of the tube during an x-ray exposure sequence, means for controlling the kilovoltage applied to the anode of the tube, an image intensifier operative to convert an x-ray image produced by the x-ray beam from the tube to an optical image, a video camera for converting said optical image to analog video signals; means for adjusting the gain of said video camera, a video monitor for translating said video signals to a visible image, and a device for controlling image brightness, said device comprising:

means for sampling the brightness of the image during successive periods and for producing a signal (B) representative of brightness during the current sampling period, means for producing a constant reference signal (A), a primary control loop including means for taking the ratio of signal A to signal B (BRIGHTNESS RATIO) such that a RATIO other than 1 indicates an error between the present brightness signal and the reference brightness signal, said primary loop including means for storing a command signal (RAD CONTROL LAST signal) corresponding to the level to which the x-ray tube mA was commanded to be at during the brightness sampling period preceding the current brightness sampling period, and means for multiplying the BRIGHTNESS RATIO signal of the current sampling period by the RAD CONTROL LAST signal to produce a NEW RAD CONTROL SIGNAL corresponding to a command signal to which said mA adjusting means responds to cause said BRIGHTNESS RATIO to substantially equal 1, means for subtracting said NEW RAD CONTROL signal from said RAD CONTROL LAST signal to produce a difference signal corresponding to the signal for commanding said means for adjusting average mA to change, a loop (kV loop) for determining the proportion of the brightness error that needs to be corrected by adjusting the kilovoltage (kV) applied to the x-ray tube anode, means providing a value called DIAL RAD CONTROL representative of the conduction interval desired for the x-ray tube during each sampling period and, hence, of the average x-ray tube mA, means for defining first and second dead band windows, the first of said windows having an upper window limit (UWL) and a lower window limit (LWL) embracing the DIAL RAD CONTROL to RAD CONTROL LAST RATIO, means providing a function of RAD CONTROL LAST, f(RCL), which function is a constant that governs the size of the window, means for adding said f(RCL) and for subtracting said f(RCL), respectively, to and from a constant, means for multiplying the result of said adding by DIAL RAD CONTROL to yield said UWL and means for multiplying the result of said subtracting by DIAL RAD CONTROL to yield said LWL, means for taking the ratio of said DIAL RAD CONTROL to RAD CONTROL LAST to obtain a RAD CONTROL RATIO (RCR), selector means responding to said RCR being between the UWL and the LWL by selecting a value of 1 in place of said RCR since there is no need for kV to change when there is only a small difference between RAD CONTROL and DIAL RAD CONTROL, said selector means responding to said RCR being outside of said window by selecting the actual value of the RCR indicative of more than a minimum available kV change being called for, means for defining an adjustable window having upper (U) and lower (L) window limits embracing said BRIGHTNESS RATIO, another selector means for selecting BRIGHTNESS RATIO, (BR), if BR is greater than U or if BR is less than L, indicative of a larger error existing so that a predetermined full step change can be commanded for kV, and for selecting a value of 1 if BR is inside of said window, multiplication means for multiplying said RAD CONTROL RATIO by the value of 1 or BRIGHTNESS RATIO, whichever is selected, to yield the kV CONTROL RATIO, said kV CONTROL RATIO corresponding to how much kV adjustment is required to correct brightness if said primary loop predicted command signal equals a value different than the RAD CONTROL signal which corresponds to the brightness error that would result if RAD CONTROL were forced to be equal to dialed RAD CONTROL, means in said kV loop for storing a command signal (kV CONTROL LAST) corresponding to the level to which the x-ray tube kV was commanded to be at during the brightness sampling period preceding the current brightness sampling period, means for converting said kV CONTROL LAST signal to a BRIGHTNESS FACTOR LAST signal representing a normalized brightness of 1 corresponding to the minimum kV available and for converting a BRIGHTNESS FACTOR LAST signal to a kV CONTROL signal, means for multiplying said BRIGHTNESS FACTOR LAST signal after conversion and said kV CONTROL RATIO signal to produce a NEW BRIGHTNESS FACTOR signal and then converting said NEW BRIGHTNESS FACTOR signal to the NEW kV CONTROL signal, and means for subtracting said kV CONTROL LAST SIGNAL from said NEW kV CONTROL signal to produce a difference signal corresponding to the signal for commanding said means for controlling the x-ray tube anode voltage to change.

12. An x-ray system comprising an x-ray tube having an anode and a filament constituting a cathode that responds flow of heating current through it by emitting electrons in quantities that are disproportionate to the temperature of said filament, a power supply for applying kilovoltage (kV) between said anode and cathode to cause flow of electron current (mA) between them accompanied by emission of x-radiation for producing an x-ray image, means for generating a digital signal (RAD CONTROL signal) that is proportional to mA desired for an x-ray exposure and is non-linearly related to said cathode heating current, a filament current controller operative to control said filament heating current in response to a command signal, and means for converting said RAD CONTROL signal to an original digital number which has a given number of digits constituting a current controller digital command signal that results in a proportional relationship resulting between RAD CONTROL signal and x-ray tube mA, said means comprising:

means for shifting said digital number representing RAD CONTROL to the right by a number of times, N, until a selected number of the most significant bits of said digital number remain, so that the selected number is composed of N digits less than the original number's given number of digits.

means for counting said number (N) of said shifts, means for taking the logarithm of the value $2^N$, means for taking the logarithm of said original digital number representing RAD CONTROL, means for summing the logarithm of said original RAD CONTROL number and said logarithm of $2^N$ to produce a logarithmic value constituting said command signal, said current controller responding to said command signal by controlling filament heating current at a value that results in tube mA being proportional to RAD CONTROL.

13. In a fluoroscopic system comprised of an x-ray tube having an anode and a cathode, means for adjusting the average current (mA) flowing between the anode and cathode of the tube during an x-ray exposure sequence, means for controlling the kilovoltage applied to the anode of the tube, an image intensifier operative to convert an x-ray image produced by the x-ray beam from the tube to an optical image, a video camera for converting said optical image to analog video signals; means for adjusting the gain of said video camera, a video monitor for translating said video signals to a visible image, and a device for controlling image brightness, said device comprising:

means for sampling the brightness of the image during successive periods and for producing a signal (B) representative of brightness during the current sampling period, means for producing a constant reference signal (A), a primary control loop including means for obtaining the ratio of signal A to signal B (BRIGHTNESS RATIO) such that a RATIO other than 1 indicates an error between the present brightness signal and the reference brightness signal, said primary loop including means for storing a command signal (RAD CONTROL LAST signal) corresponding to the level to which the x-ray tube mA was commanded to be at during the brightness sampling period preceding the current brightness sampling period, and means for multiplying the BRIGHTNESS RATIO signal of the current sampling period by the RAD CONTROL LAST signal to produce a NEW RAD CONTROL SIGNAL corresponding to a command signal to which said mA adjusting means responds to cause said BRIGHTNESS RATIO to substantially equal 1, means for subtracting said NEW RAD CONTROL signal from said RAD CONTROL LAST signal to produce a difference signal corresponding to the signal for commanding said means for adjusting average mA to change, said means for obtaining the ratio of signal A to signal B, which is the BRIGHTNESS RATIO, being adapted to stabilize x-ray pulse-widths and said means includes:

means for defining a window having an upper window limit (UWL) and a lower window limit (LWL), said reference being centered between said limits, said means including means for adding to said reference a function of RAD CONTROL LAST, f(RCL), to yield an upper window limit and means for subtracting said f(RCL) from said reference to yield a lower window limit, the f(RCL) being series of LOCK VALUES and CAPTURE VALUES, said CAPTURE VALUES varying over a RAD CONTROL LAST range beginning with a critical RCL value and corresponding pulse-width where the control system begins to exhibit instability and said range of RCL values extending to the minimum RCL and pulse-width point obtainable in the system, said point being given an f(RCL) value, corresponding to a CAPTURE VALUE that will provide appropriate upper and lower window limits above and below said reference value to capture the brightness sample value, said CAPTURE VALUES descending from said minimum RCL linearly to a constant at said critical RCL value, said LOCK VALUES corresponding to a multiple of said CAPTURE VALUES, selector means supplied with the brightness sample value A and the reference value B, said selector means operating to select A if the sample value A is greater than the UWL or the sample value is less than the LWL in which case the f(RCL) CAPTURE VALUES is used to form the upper and lower window limits for the next sample period, said selector means operating to select B if the LWL is less than or equal to the sample value and the sample value is less than UWL and the LOCK VALUE f(RCL) is used to form the UWL and LWL during said next sample period, means for dividing the reference value by the selected one of reference or the sample to yield said BRIGHTNESS RATIO, a loop (kV loop) for determining the proportion of the brightness error that needs to be corrected by adjusting the kilovoltage (kV) applied to the x-ray tube anode, said kV loop including means for taking the ratio of said RAD CONTROL LAST signal (A) and a dialed RAD CONTROL signal (B) corresponding to the conduction interval desired for the x-ray tube during each sampling period and, hence, to the average x-ray tube mA, the signal resulting from taking the ratio of the RAD CONTROL LAST and dialed RAD CONTROL signals being designated the RAD CONTROL RATIO signal, said kV loop including means for multiplying said RAD CONTROL RATIO signal and said BRIGHTNESS RATIO SIGNAL for producing a kV CONTROL RATIO signal corresponding to how much kV adjustment is required to correct brightness if said primary loop predicted command signal equals a value different than the selected RAD CONTROL signal which corresponds to the brightness error that would result if RAD CONTROL signal were forced to be equal to the dialed SELECTED RAD CONTROL signal, means in said kV loop for storing a command signal (kV CONTROL LAST) corresponding to the level to which the x-ray tube kV was commanded to be at during the brightness sampling period preceding the current brightness sampling period, means for converting said kV CONTROL LAST signal to a BRIGHTNESS FACTOR LAST signal representing a normalized brightness of 1 corresponding to the minimum kV available and for converting a BRIGHTNESS FACTOR LAST signal to a kV CONTROL signal, means for multiplying said BRIGHTNESS FACTOR LAST signal after conversion and said kV CONTROL RATIO signal to produce a NEW BRIGHTNESS FACTOR signal and then converting said NEW BRIGHTNESS FACTOR signal to the NEW kV CONTROL signal, and means for subtracting said kV CONTROL LAST SIGNAL from said NEW kV CONTROL signal to produce a difference signal corresponding to the signal for commanding said means for controlling the x-ray tube anode voltage to change.

14. The controller according to claim 5 including aperture shutter means in the optical path to said video camera means, an adjstable gain video signal amplifier having an input for video signals from said video camera and an input for said VG difference signal and having an output, means for driving said shutter means to control the area of said aperture, means for generating a reference signal representative of a preset aperture gain, a first summing amplifier having input means for said VG difference signal and for said aperture gain reference signal and having an output, a first subtractor having an input coupled to said summing factor output, having another input and an output, an area-to-video gain converter operative to feed back to said other input of the first subtractor a feedback signal representative of the area of said aperture, a second subtractor having an input for receiving said reference signal representing said preset aperture gain, an input for receiving said feedback signal and an output, said second subtractor continuously producing a difference signal that varies in proportion to aperture area, a second summing amplifier having input means and having an output coupled to said gain control input of said video gain amplifier for varying the electronic gain of said video camera, means for generating a second reference signal representative of a preset electronic gain for said video signal amplifier, said reference signal being coupled to said second summing amplifer input means, a third subtractor having an input receiving said VG difference signal and an input receiving said difference signal and having an output coupled to said second summing amplifier input means, and means for coupling said output of said video signal amplifier to video monitor.

* * * * *

UNITED STATES PATENT AND TRADEMARK OFFICE
CERTIFICATE OF CORRECTION

PATENT NO. : 4,703,496

DATED : October 27, 1987

INVENTOR(S) : Thomas V. Mecariello, et al

It is certified that error appears in the above-identified patent and that said Letters Patent is hereby corrected as shown below:

On the title page the name of one of the co-inventors should be added as follows:

-- Jeffrey A. Kautzer, Waukesha, Wis. --.

Signed and Sealed this

Twenty-fifth Day of October, 1988

*Attest:*

DONALD J. QUIGG

*Attesting Officer*     *Commissioner of Patents and Trademarks*